United States Patent [19]
Hamai et al.

[11] Patent Number: 5,543,937
[45] Date of Patent: Aug. 6, 1996

[54] APPARATUS FOR RECORDING AND PLAYING BACK DIGITAL DATA

[75] Inventors: Shinji Hamai, Osaka; Akira Iketani, Higashiosaka; Chiyoko Matsumi, Suita; Tatsuro Juri, Osaka; Masazumi Yamada, Moriguchi; Yasunori Kawakami; Yuuzou Murakami, both of Osaka, all of Japan

[73] Assignee: Matsushita Electric Industrial Co. Ltd., Osaka, Japan

[21] Appl. No.: 235,956

[22] Filed: May 2, 1994

[30]     Foreign Application Priority Data

| May 14, 1993 | [JP] | Japan | 5-112852 |
| Aug. 25, 1993 | [JP] | Japan | 5-210169 |
| Oct. 4, 1993 | [JP] | Japan | 5-247908 |
| Nov. 17, 1993 | [JP] | Japan | 5-287937 |
| Nov. 17, 1993 | [JP] | Japan | 5-288030 |

[51] Int. Cl.⁶ ................................................. H04N 5/783
[52] U.S. Cl. ........................... 358/341; 348/423; 358/335
[58] Field of Search ............................. 358/310, 312, 358/335, 341; 348/423; H04N 5/783

[56]         References Cited

U.S. PATENT DOCUMENTS

| 4,652,944 | 3/1987 | Tindall | 360/37.1 |
| 4,949,187 | 8/1990 | Cohen | 358/335 |
| 4,985,783 | 1/1991 | Falck | 358/335 |
| 5,138,501 | 8/1992 | Ii | 360/32 |
| 5,159,502 | 10/1992 | Ejima | 360/32 |

FOREIGN PATENT DOCUMENTS

| 0173411 | 3/1986 | European Pat. Off. . |
| 0387882 | 9/1990 | European Pat. Off. . |
| 0416663 | 3/1991 | European Pat. Off. . |
| 0522869 | 1/1993 | European Pat. Off. . |

OTHER PUBLICATIONS

*Patent Abstracts of Japan*, vol. 14, No. 451 (E-984) Sep. 1990 & JP-A-02 179 188 (Matsushita) 12 Jul. 1990.

*Primary Examiner*—Howard W. Britton
*Attorney, Agent, or Firm*—Beveridge, DeGrandi, Weilacher & Young, L.L.P.

[57]             ABSTRACT

An apparatus serving as a digital videocassette recorder (VCR) for recording analog video and audio signals as digital signals. The apparatus serves also as a digital data storage drive. The digital VCR and the storage drive share common circuitry and a common magnetic recording medium. This reduces the cost and enhances the efficiency at which tracks are used. The apparatus has a large storage capacity. The apparatus divides input digital data into two parts and performs error correction encoding for each of these two data parts to form sync blocks. These sync blocks are recorded in an audio signal recording area and a video signal recording area, respectively, on the recording medium. Error correction codes used during reading of digital data are the same as those used during recording of video and audio signals. The same track structure and the same sync block structure are used for these two modes of operation.

48 Claims, 26 Drawing Sheets

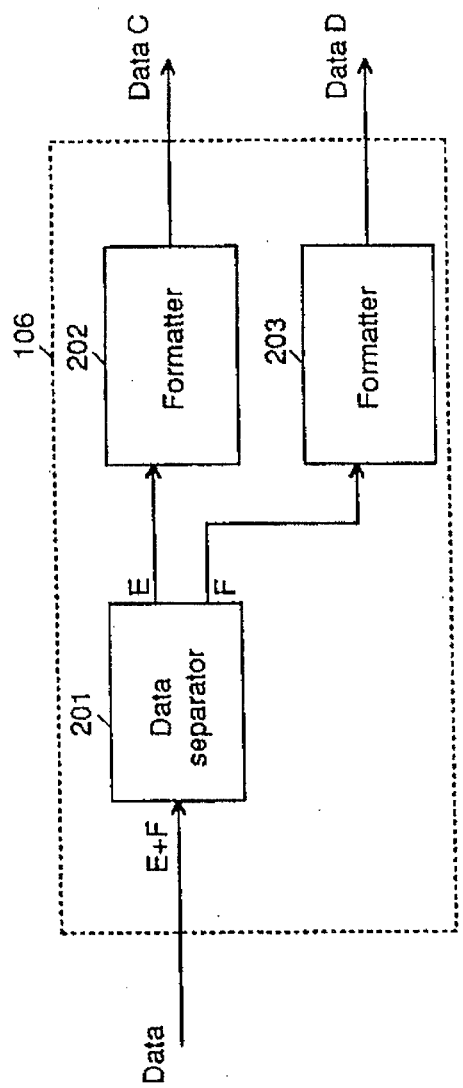
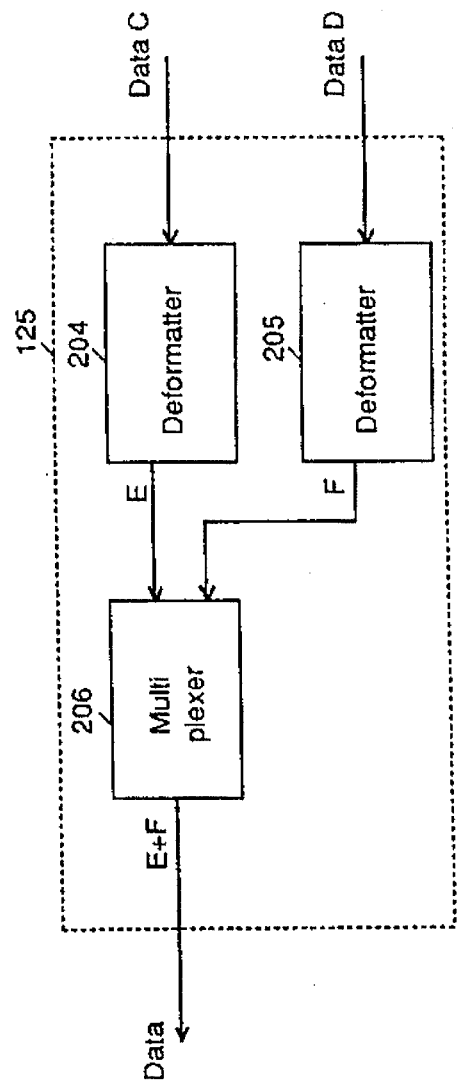
Figure 7(a)
Figure 7(b)

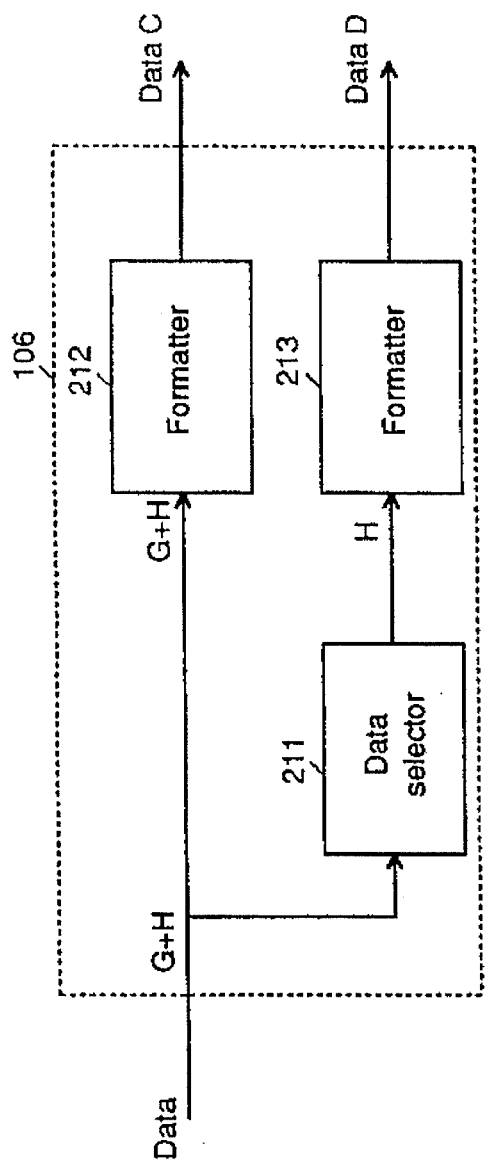
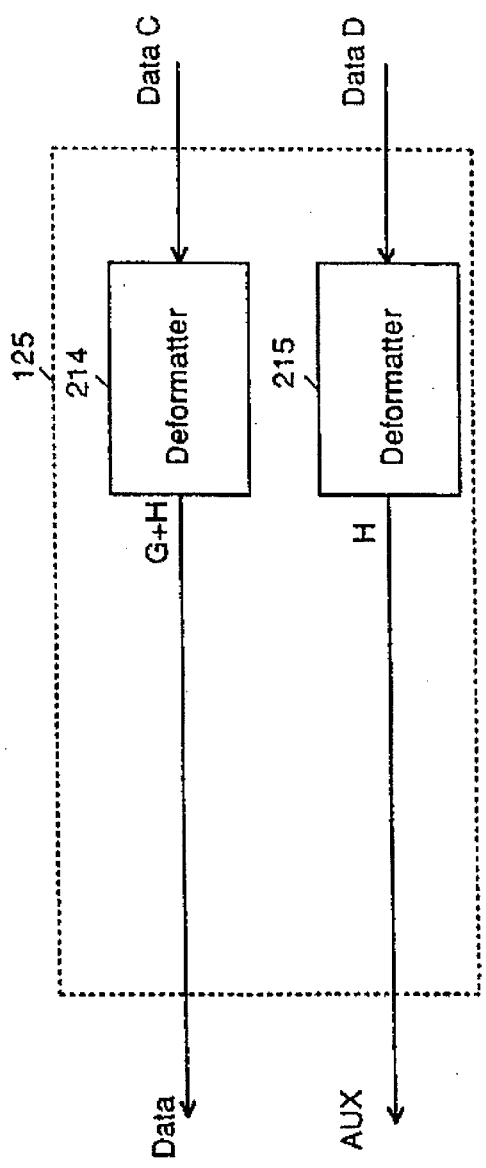

AUX:Auxiliary data

AUX: Auxilliary data

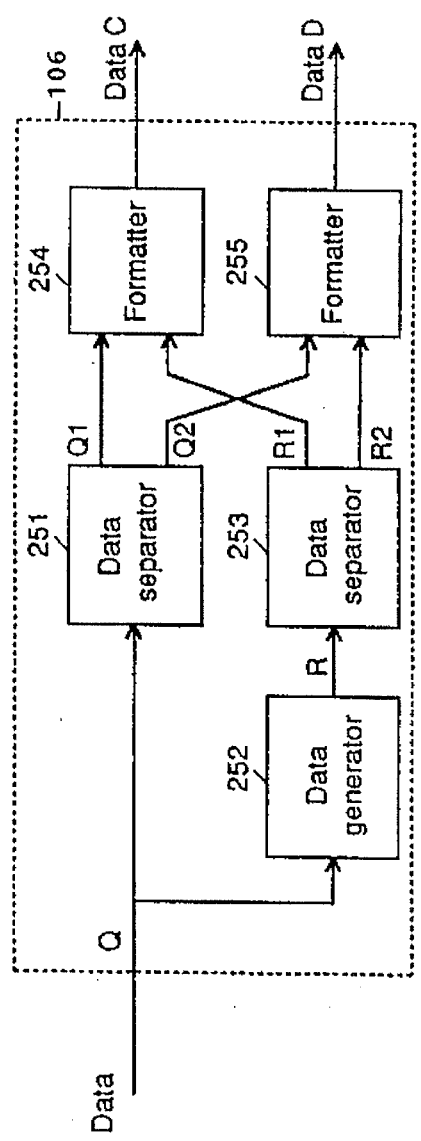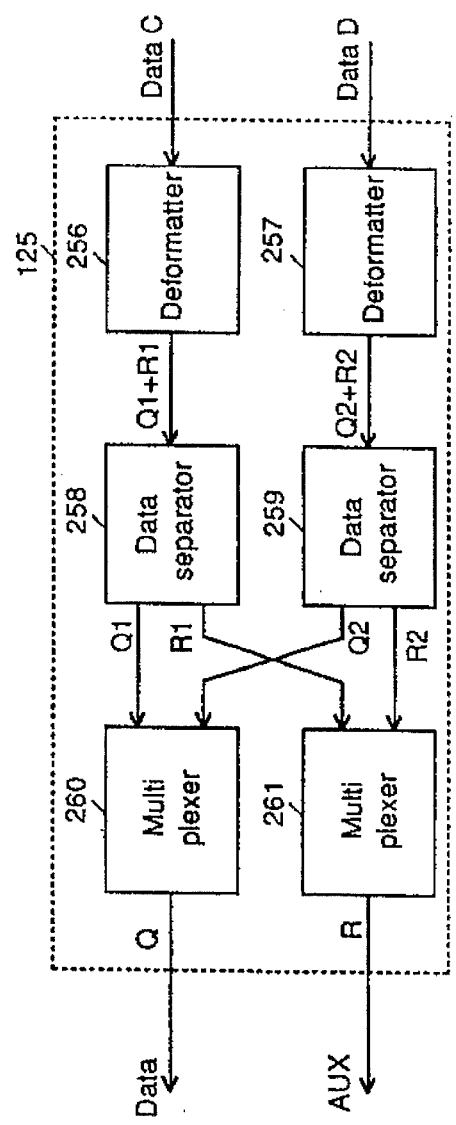
Figure 12(a)
Figure 12(b)

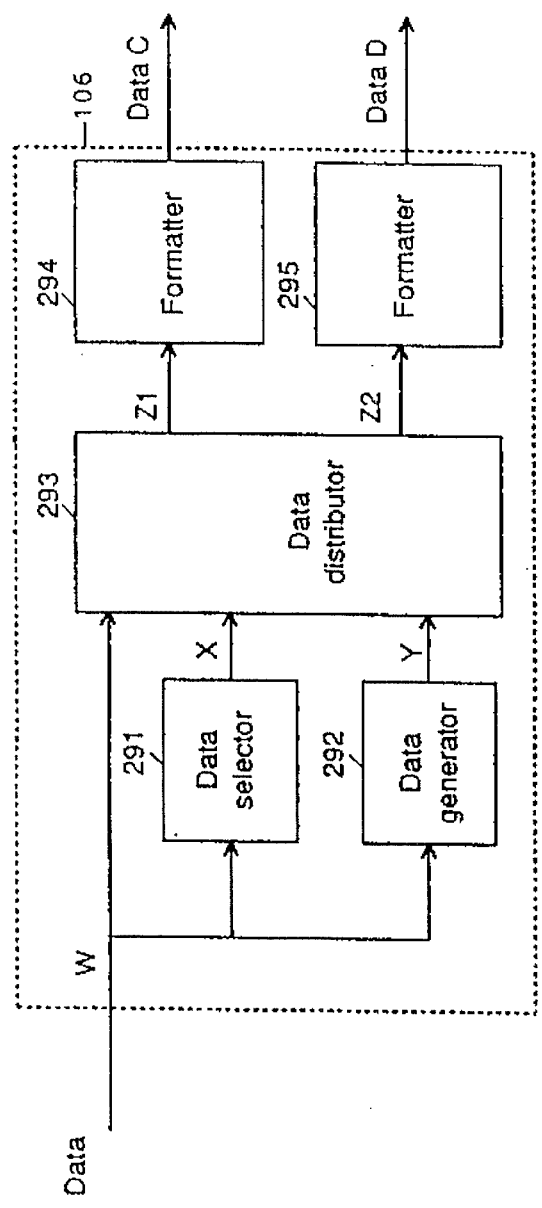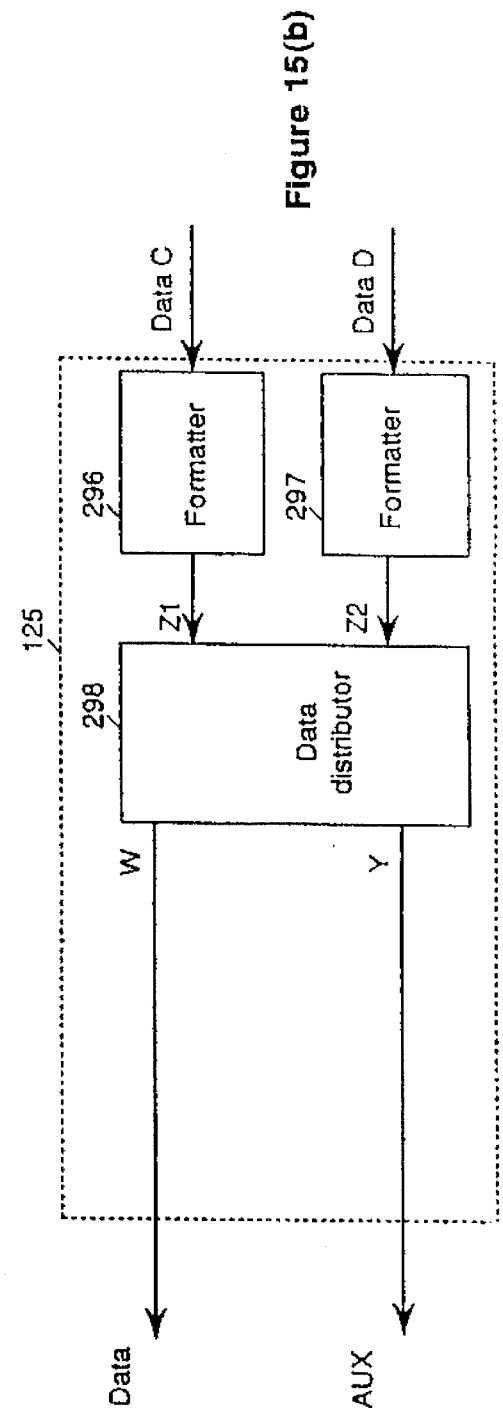

APPARATUS FOR RECORDING AND PLAYING BACK DIGITAL DATA

BACKGROUND OF THE INVENTION

1. Field of the Invention

The present invention relates to an apparatus for recording and playing back digital data.

2. Description of the Prior Art

Analog recording has been heretofore used for a video cassette recorder (VCR). Where images are recorded in analog form and played back by VCR units, especially when dubbings are made, the image quality is deteriorated severely. Therefore, development of a VCR utilizing digital recording has been expected.

When an analog VCR unit is in the playback mode, signals distorted by noises and jitters are directly delivered from the VCR unit. If an edit, dubbing, or other operation is performed, distortions are accumulated. As a result, the playback image quality is deteriorated. However, in a digital VCR unit, an analog video signal and analog audio signals are sampled and converted into discrete quantized digital values, and then these digital values are recorded. Since the recorded values are discrete values, if the amount of noise is sufficiently small, then correctly recorded digital values can be easily obtained. Where erroneous digital values are obtained, they can be corrected by adding error correction codes during reading. In this way, in digital recording, image quality deterioration due to dubbing or the like can be suppressed greatly.

On the other hand, when an NTSC (the National Television Systems Comitee) signal that is broadcast by TV is digitized, the amount of data is increased, because when analog values are used, information at one point is expressed by one analog value, whereas when digital values are used, the same information is represented by plural data items. Therefore, use of digital VCR units is mostly restricted to broadcast applications.

In recent years, however, as the technique for compressing image information has evolved, it has become possible to compress video signals such that the amount of data is reduced by a factor expressed by one or two digits. Consequently, a consumer digital VCR unit which provides higher image quality and suffers from less image quality deterioration on dubbing compared with the conventional consumer analog VCR units can be accomplished.

Such consumer digital VCR machines utilizing the compressing techniques are capable of providing higher image quality than the conventional consumer analog VCR machines. Also, these digital VCR machines can be built in smaller size. Furthermore, it is considered that the consumer VCR machines can be fabricated in lower cost because they can be mass-produced.

Magnetic disks, magnetic tape, and others have been known as recording media for computers. Magnetic tape having a large storage capacity is used to back up data. As one kind of such magnetic tape, digital data storage (DDS) based on the format of digital audio tape (DAT) is known.

SUMMARY OF THE INVENTION

It is an object of the present invention to provide an inexpensive apparatus for storing digital data.

It is another object of the invention to provide an inexpensive apparatus which incorporates both a digital VCR (videocassette recorder) for recording and playing back analog video and audio signals as digital signals and a digital data storage drive for writing and reading digital data. In particular, the digital VCR and the digital data storage drive share error-correction encoding means, error correction decoding means, recording/playback means, and circuits, and use a common magnetic recording medium.

It is a further object of the invention to provide an inexpensive digital data storage drive which does not share any circuit or magnetic recording medium with a digital VCR but uses circuit components and a magnetic recording medium that are expected to be fabricated at lower costs because of exploitation of the fabrication techniques of mass-produced consumer digital VCR machines.

It is a yet other object of the invention to provide an inexpensive apparatus which incorporates both a digital VCR (videocassette recorder) for recording and playing back analog video and audio signals as digital signals and a digital data storage drive for writing and reading large amounts of digital data. The digital VCR and the digital data storage drive share recording and playback means and thus share circuits and a magnetic recording medium. The storage drive uses tracks efficiently.

It is an additional object of the invention to provide a digital data storage drive which does not share any circuit or magnetic recording medium with a digital VCR but has components that are expected to be fabricated at lower costs because of exploitation of the fabrication techniques of mass-produced consumer digital VCR machines, and which apparatus can be fabricated economically and uses tracks efficiently.

In a first feature of the invention, input digital data is divided into two data parts. Error correction encoding is done for each data part, and sync blocks are formed. These sync blocks are recorded in both an audio signal recording area and a video signal recording area. During playback, data is played back from the audio signal recording area and from the video signal recording area. Digital data is reconstructed from the two data parts and then the data is delivered. The error correction codes used when digital data is recorded are the same as those used when video and audio signals are recorded. Also, the same track structure and the same sync block structure are employed for both cases.

In this way, digital data is written and read, using the same error correction codes, the same track structure, and the same sync block structure as used in a digital VCR machine. This makes it possible to use error correction encoding circuits, error correction circuits, memories, a writing circuit, a reading circuit, and a magnetic recording medium in common with a digital VCR machine.

In a second feature of the invention, input digital data is subjected to outer error correction encoding and then inner error correction encoding is done. Sync blocks are formed and recorded in a region consisting of an audio signal recording area, a video signal recording area, and gaps. During reading, the sync blocks are read from the region, and error corrections are done. Digital data is reconstructed and produced as an output signal. The same inner correction codes are used when digital data is recorded or when analog video and audio signals are recorded. Also, the same track structure and the same sync block structure are used for both cases.

In this manner, digital data is written and read, using the same error correction codes, the same track structure, and the same sync block structure as used in a digital VCR machine. This makes it possible to use error correction encoding circuits, error correction circuits, memories, a writing circuit, a reading circuit, and a magnetic recording medium in common with a digital VCR machine.

Other objects and features of the invention will appear in the course of the description thereof, which follows.

BRIEF DESCRIPTION OF THE DRAWINGS

FIGS. 7(a) and 7(b) are block diagrams of data processors 106 and 125 of Example 1;

FIGS. 8(a) and 8(b) are block diagrams of modifications of the data processors 106 and 125 shown in FIGS. 7(a) and 7(b);

FIGS. 12(a) and 12(b) are block diagrams of still further modifications of the data processors 106 and 125 shown in FIGS. 7(a) and 7(b);

FIG. 15(a) and 15(b) are block diagrams of still additional modifications of the data processors 106 and 125 shown in FIGS. 7(a) and 7(b);

DESCRIPTION OF THE PREFERRED EMBODIMENTS

Figure 1:
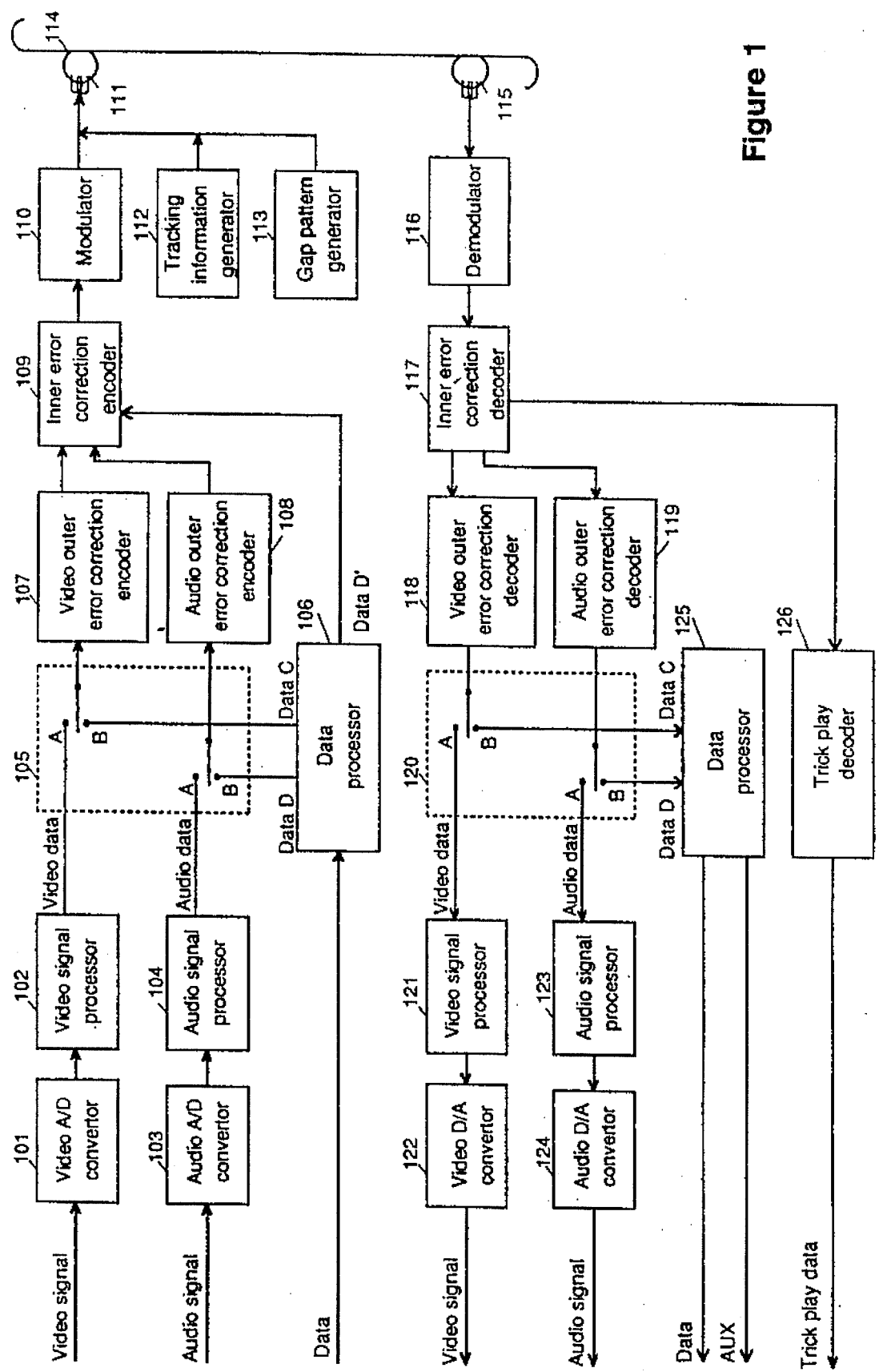
FIG. 1 is a block diagram of a recording/playback apparatus according to the invention, the apparatus forming Example 1 of the invention.

Referring to FIG. 1, there is shown a recording/playback apparatus embodying the concept of the present invention. When video and audio signals are recorded by the apparatus, the movable contacts of switches 105 and 120 are connected with terminals A.

An analog video signal is applied to a video A/D converter 101, which samples, quantized, or otherwise processes the video signal and produces a digital video signal to a video signal processor 102. This video signal processor 102 rearranges, compresses, or otherwise processes the digital video signal and produces video data. The video data are applied to the switch 105 in the order in which the data are recorded on tracks.

An analog audio signal is applied to an audio A/D converter 103, which samples, quantizes, or otherwise processes the audio signal and produces a digital audio signal to an audio signal processor 104. This signal processor 104 rearranges, compresses, or otherwise processes the digital audio signal and produces audio data. The audio data are applied to the switch 105 in the order in which the data are recorded on tracks. The switch 105 sends the video data to a video outer error correction encoder 107 and the audio data to an audio outer error correction encoder 108. The video outer error correction encoder 107 performs outer error encoding on the video data and produces video outer parities. The video data and the video outer parities are sent to an inner error correction encoder 109. The audio outer error correction encoder 108 performs outer error encoding on the audio data and creates audio outer parities. The audio data and audio outer parities are sent to the inner error correction encoder 109, which first divides the video data, video outer parities, audio data, and audio outer parities into given blocks. The correction encoder 109 then performs inner error correction encoding on each block and produces inner parities which are placed behind the block. All the blocks and inner parities are delivered to a modulator 110. This modulator 110 places a sync pattern and a block address before each block to form each sync block. The sync pattern and the block address are used as marks for separating blocks during playback. Then, the modulator modulates the sync block to produce a modulated signal to a record head 111. A tracking information generator 112 creates information for actuating the tracking servo and sends the information to the record head 111. A gap pattern generator 113 creates a pattern of interblock gaps and rear gaps to the record head 111. This head 111 records the modulated signal, the tracking information, and the gap pattern on magnetic tape 114.

Figure 2:
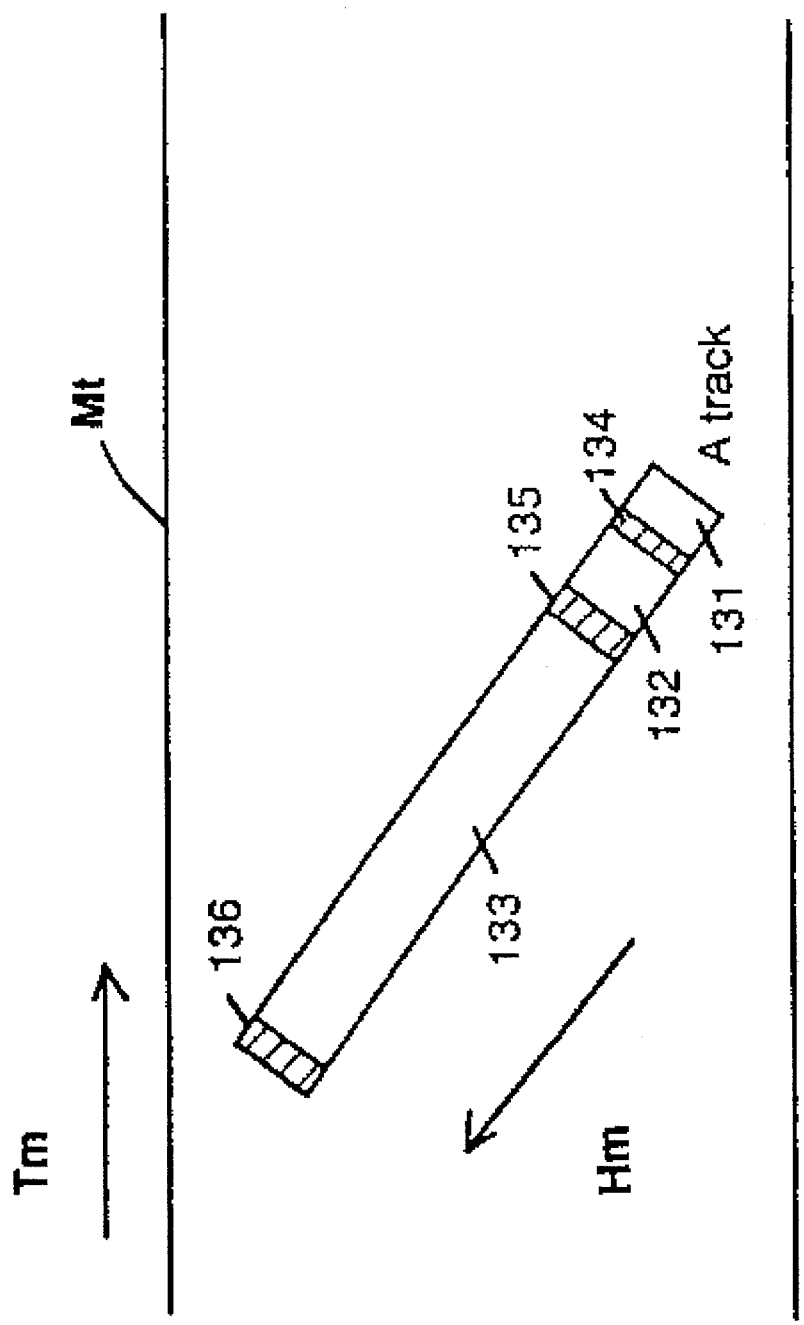
FIG. 2 is a diagram illustrating the track pattern created by the apparatus shown in FIG. 1.

FIG. 2 shows the track pattern when video and audio signals are recorded. A tracking information recording area 131, an audio signal recording area 132, and a video signal recording area 133 are recorded in this order from the head of each track. A gap 134 is recorded between the areas 131 and 132. Another gap 135 is recorded between the areas 132 and 133. The head motion is shown by arrow Hm while the tape motion of magnetic tape Mt or 114 is shown by arrow Tm. A further gap 136 is recorded behind the area 133.

Figure 3:
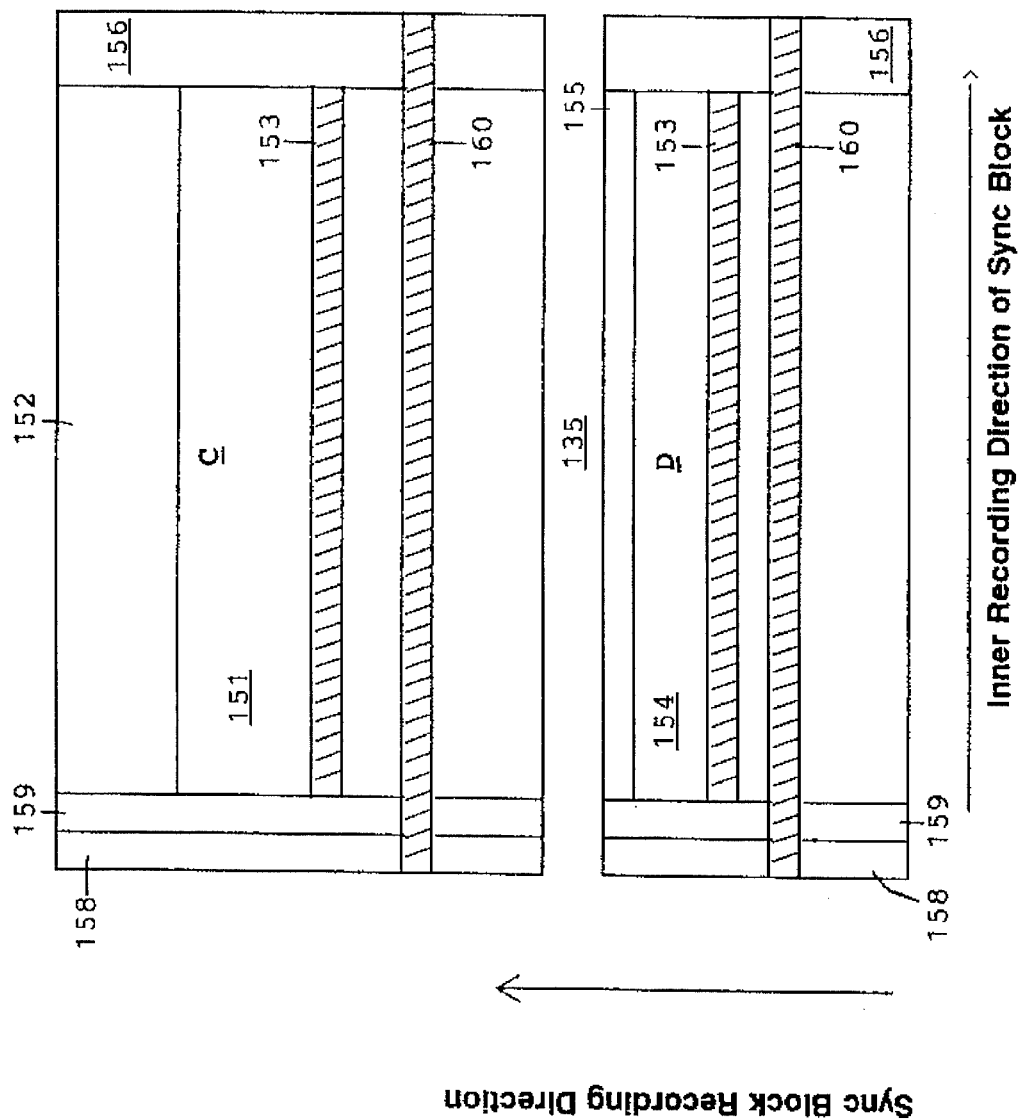
FIG. 3 is a diagram illustrating the structure of tracks created by the apparatus shown in FIG. 1.

FIG. 3 shows the arrangement of recorded data. Video outer parities 152 are created from video data 151. A block 153 is created from both video data 151 and video outer parities 152. At the same time, audio outer parities 155 are created from audio data 154. The block 153 is generated from both audio data 154 and audio outer parities 155. Inner parities 156 are created for the block 153 and placed behind the block. A sync pattern 158 and a block address 159 are placed before a block 153. These sync pattern 158, block address 159, block 153, and inner parities 156 together form a sync block 160. Sync blocks formed in this way are modulated and recorded. The gap 135 is recorded between sync blocks which are constituted by the video data 151 and the audio data 154, respectively. These gaps are used to permit the video and audio data to be separately recorded.

During playback, video and audio signals are played back from the magnetic tape 114 by a playback head 115. This playback head 115 produces an output signal to a demodulator 116, which demodulates the output signal from the playback head, separates blocks, using sync patterns as marks, and produces the signal to an inner error correction decoder 117. This decoder 117 performs inner error correction coding, based on the inner parities added to the block, and produces the block excluding the parities to a video outer error correction decoder 118 and to an audio outer error correction decoder 119. At this time, the inner error correction decoder 117 produces those blocks recorded in the video signal recording area to the video outer error correction decoder 118 and those blocks recorded in the audio signal recording area to the audio outer error correction decoder 119, according to the addresses of these blocks. The video outer error correction decoder 118 performs outer error correcting on input blocks and produces the corrected blocks as video data to the switch 120. The audio outer error correction decoder 119 performs outer error correcting on the input blocks and produces the corrected blocks as audio data to the switch 120. The switch 120 delivers the video data to a video signal processor 121, which rearranges, expands, or otherwise processes the video data and produces the data as a digital video signal to a video D/A converter 122. This converter 122 converts the input digital video signal into an analog video signal and produces it as an output signal. The switch 120 sends the audio data to an audio signal processor 123, which rearranges, expands, or otherwise processes the audio data and produces the processed data as a digital audio signal to an audio D/A converter 124. This converter 124 converts the input digital signal into an analog audio signal and produces it as an output signal.

When the novel apparatus is used as a digital data storage drive to write and read digital data, the movable contacts of the switches 105 and 120 are connected with terminals B. Digital data is supplied to a data processor 106. This processor 106 rearranges the input digital data, creates data, selects some of the data, or performs other processing, and then creates data indicative of the kinds of the data. In the present example, data C and D are created and delivered to the switch 105. The switch 105 delivers the data C to the video outer error correction encoder 107 and the data D to the audio outer error correction encoder 108. The video outer error correction encoder 107 performs outer error correction encoding on the data C and creates video outer parities. Both data C and video outer parities are delivered to the inner error correction encoder 109. The audio outer error correction encoder 108 performs outer error correction encoding on the data D and creates audio outer parities. The data D and the audio outer parities are sent to the inner error correction encoder 109. This correction encoder 109 divides the data C, the video outer parities, the data D, and the audio outer parities into given blocks, performs inner error correction encoding on the blocks, creates inner parities, and places these inner parities behind the blocks. The blocks and the inner parities are sent to the modulator 110. The modulator 110 places the sync pattern and the block addresses before the blocks to form sync blocks. The sync pattern and the block addresses are used to detect blocks during reading. Then, the modulator 110 modulates the sync blocks to produce a modulated signal to the record head 111. The tracking information generator 112 creates information used to activate the tracking servo, and sends the information to the record head 111. The gap pattern generator 113 produces a pattern of interblock gaps and rear gaps to the record head 111. The record head 111 records the modulated signal, the tracking information, and the gap pattern on the magnetic tape 114.

During reading, signals in digital form are retrieved from the magnetic tape 114 by the playback head 115. The output signal from the playback head 115 is sent to the demodulator 116. The demodulator 116 demodulates the output signal from the playback head, separates blocks, using sync patterns as marks, and produces the signal to the inner error correction decoder 117. This decoder 117 performs inner error correcting, based on the inner parities added to the blocks, and produces the blocks excluding the parities to the video outer error correction decoder 118 and to the audio outer error correction decoder 119. At this time, the inner error correction decoder 117 produces those blocks recorded in the video signal recording area to the video outer error correction decoder 118 and those blocks recorded in the audio signal recording area to the audio outer error correction decoder 119, according to the addresses of these blocks. The video outer error correction decoder 118 performs outer error correcting on input blocks and produces the corrected blocks as data C to the switch 120. The audio outer error correction decoder 119 performs outer error correcting on the input blocks and produces the corrected blocks as data D to the switch 120. The switch 120 delivers the data C and D to the video signal processor 125, which rearranges or otherwise processes the data C and D according to data indicating the kinds of the data and included in the data C and D and delivers the recorded digital data. Also, the data processor 125 produces created or selected auxiliary data. The auxiliary data can be data indicating the recording time and the size of the data and other information auxiliary to the input data.

Where the input data is a digital video signal or the like, data about trick plays is conceivable. During a trick play, the amount of data which can be played back might be small, and the amount of error might be large. Therefore, the image quality during a trick play can be improved by separately creating data about trick plays or separately recording the data.

Where the input data is digital data divided into blocks, the data might indicate the addresses of the blocks, the initial or final address of the recorded blocks, the size of the blocks, the position of marks for searching, or the number of the marks.

Parities created when error correction encoding is performed on digital data to be recorded can be recorded as auxiliary data. In this case, a highly reliable storage drive almost free of error can be accomplished. These kinds of auxiliary data may be combined and recorded.

When digital video data is recorded as the digital data and a trick play is done, the blocks error-corrected by the inner error correction decoder 117 are sent to a trick play decoder 126. This trick play decoder 126 decodes the digital video signal out of the input blocks and produces this signal as an output signal, for the following reason. During a trick play such as fast search, not all the data can be played back and so it is difficult to perform outer error correcting. The trick play decoder 126 is added only when a digital video signal is recorded and played back.

The track pattern created when digital data is recorded is the same as the track pattern when analog video and audio signals are recorded. In FIG. 2, the data C is recorded in the area where video data is recorded. The data D is recorded in the area where audio signals are recorded.

In this way, when the movable contacts of the switches 105 and 120 are connected to the terminal A, video and audio signals can be recorded and played back. When the movable contacts of the switches 105 and 120 are connected to the terminal B, digital data can be recorded and played back. Hence, in this apparatus, the digital data storage drive can share circuitry with the digital VCR. As a result, the apparatus has great advantages including low cost and compactness.

Figure 4:
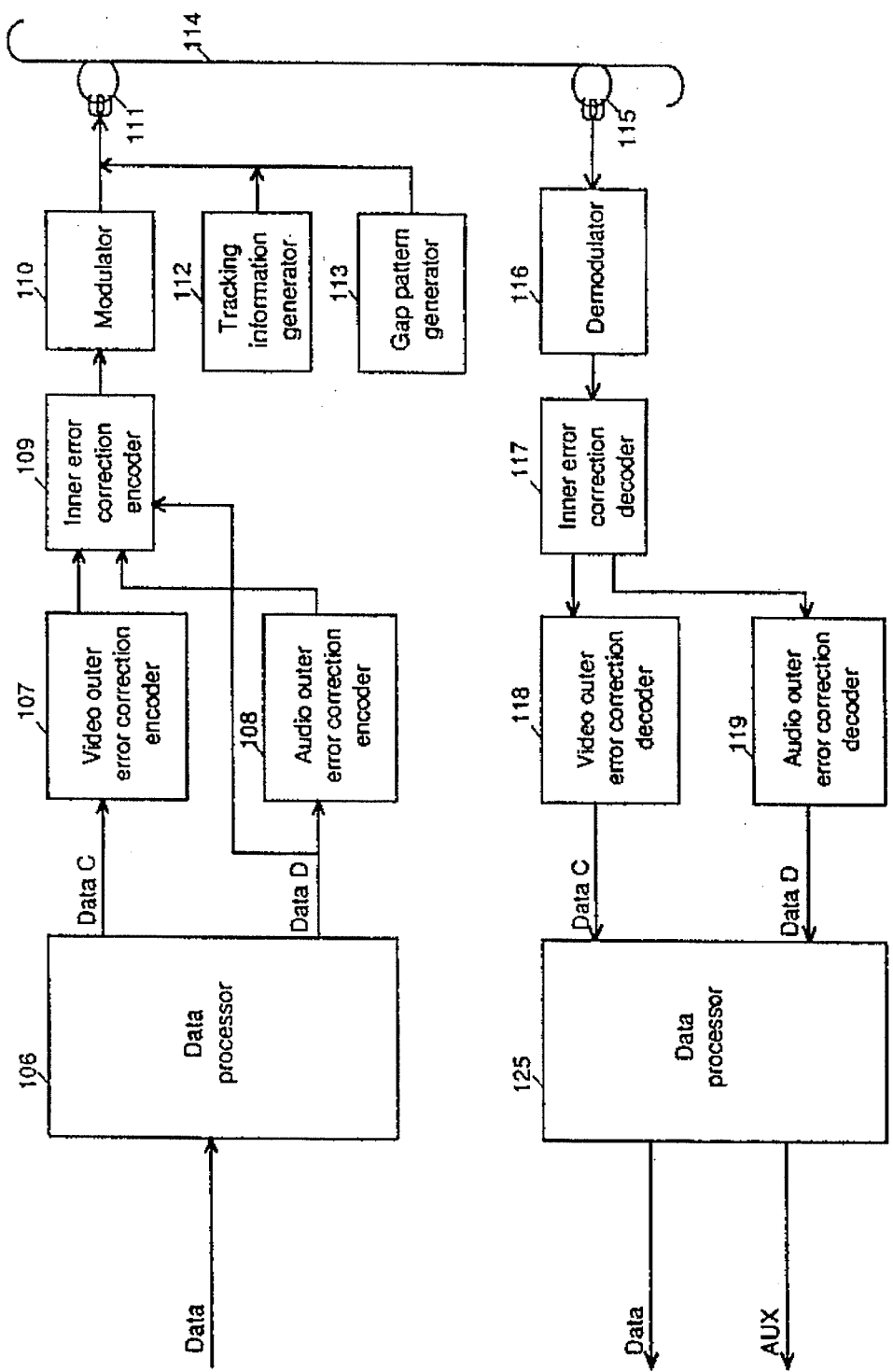
FIG. 4 is a block diagram of a modification of Example 1.

A recording/playback apparatus which writes and reads only digital data, or a digital data storage drive, is shown in the block diagram of FIG. 4. This storage drive has a data processor 106, a video outer error correction encoder 107, an audio outer error correction encoder 108, an inner error correction encoder 109, a modulator 110, a tracking information generator 112, a gap pattern generator 113, a record head 111, a magnetic tape 114, a playback head 115, a demodulator 117, an inner error correction decoder 117, a video outer error correction decoder 118, an audio outer error correction decoder 119, a data processor 125, and a trick play decoder 126 in common with the recording/playback apparatus previously described in conjunction with FIG. 1. The storage drive constructed in this way can write and read digital data. Because of this structure, the digital data storage drive can share circuitry with the digital VCR. As a result, the apparatus has great advantages including low cost and compactness.

Figure 5:
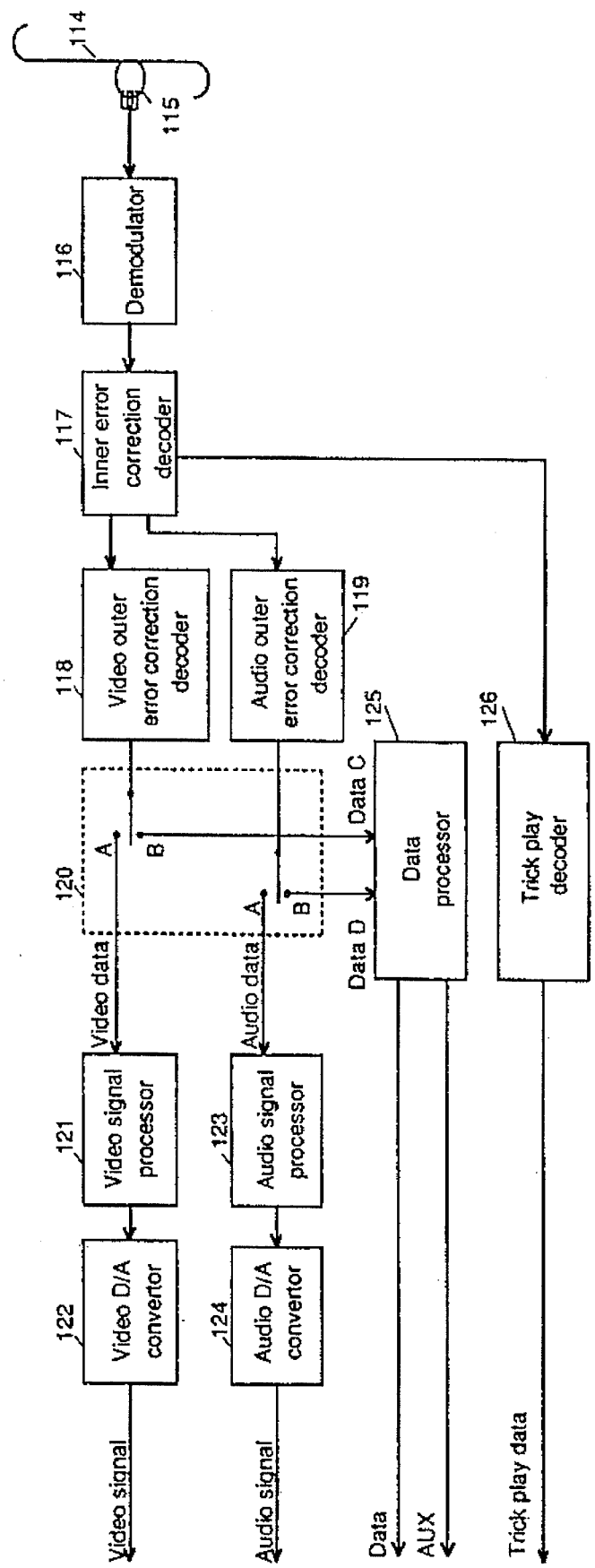
FIG. 5 is a block diagram of another modification of Example 1.

A modification of the apparatus acting as a recording/playback apparatus and also as a digital data storage drive is shown in the block diagram of FIG. 5. This apparatus has a magnetic tape 114, a playback head 115, a demodulator 116, an inner error correction encoder 117, a video outer error correction decoder 118, an audio outer error correction decoder 119, a switch 120, a video signal processor 121, a video D/A converter 122, an audio signal processor 123, an audio D/A converter 124, a data processor 125, and a trick play decoder 126 in common with the recording/playback apparatus already described in connection with FIG. 1. When the movable contacts of the switch 120 are connected with the terminals A, video and audio signals can be played back. When the movable contacts of the switch 120 are connected with the terminal B, digital data can be retrieved. Because of this structure, this apparatus can act as a digital data storage drive and also as circuitry of a digital VCR. As a result, the apparatus has great advantages including low cost and compactness.

Figure 6:
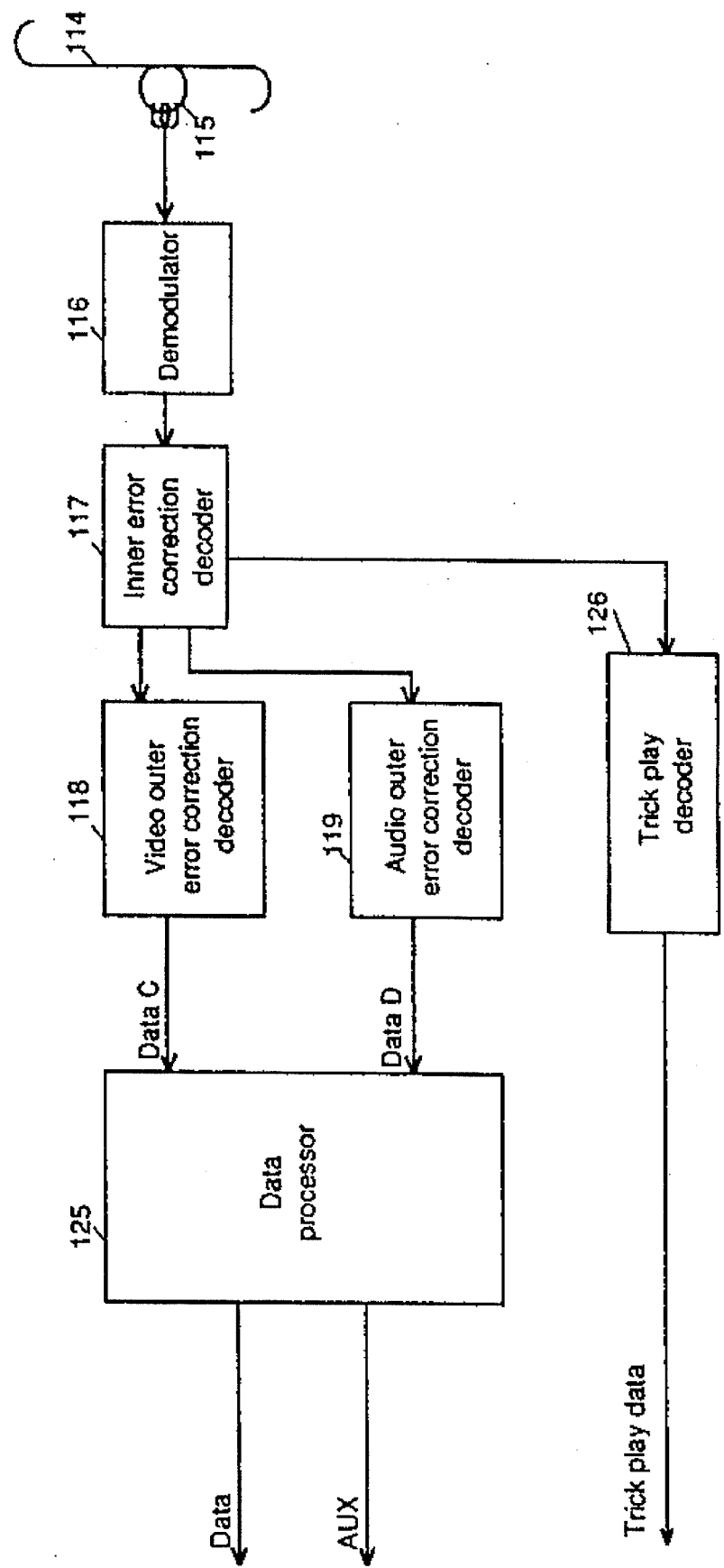
FIG. 6 is a block diagram of a further modification of Example 1.

A further digital data storage drive is shown in the block diagram of FIG. 6. This storage drive has a magnetic tape 114, a playback head 115, a demodulator 116, an inner error correction decoder 117, a video outer error correction decoder 118, an audio outer error correction decoder 119, a data processor 125, and a trick play decoder 126 in common with the recording/playback apparatus already described in connection with FIG. 1. The apparatus designed in this way is able to read out digital data. Because of this structure, the digital data storage drive can share circuitry with the digital VCR. As a result, the apparatus has great advantages including low cost and compactness.

An example of the data processor 106 is shown in the block diagram of FIG. 7(a). During reading, data (E+F) is applied to a data separator 201, which divides the data (E+F) into data E and data F in a given manner. The data E and F are supplied to formatters 202 and 203, respectively. The formatter 202 rearranges the data E, performs error correction encoding, generates data indicating the kinds of data, or otherwise processes the data E, if necessary, and produces the processed data as data C. The formatter 203 rearranges the data F, performs error correction encoding, creates data indicating the kinds of data, or otherwise processes the data F, if necessary, and produces the processed data as data D.

When digital data or video data is recorded, the data D is sent from the data processor 106 to the inner error correction encoder 109. The data D can also be recorded in the area where parities generated by the audio outer error correction encoder 108 are recorded. At this time, more data D, i.e., data about trick plays, can be recorded. This permits trick plays to be done with improved image quality. During a trick play, only a part of the data recorded on the magnetic tape can be played back and so outer error correction encoding requiring more data for error corrections cannot be performed. For this reason, it is not necessary to record outer parities, and more data about trick plays can be recorded in the area where outer parities are recorded. In this case, during a trick play, played back data is subjected to inner error correcting by the inner error correction decoder 117 and then sent to the trick play decoder 126, in the same way as during a trick play.

An example of the data processor 125 used for this purpose is shown in the block diagram of FIG. 7(b). During reading of data, data C is supplied to a deformatter 204. This deformatter 204 rearranges the data C, performs error correcting, or otherwise processes the data C, according to the data indicating the kinds of the data, and produces the processed data as data E. The data E is routed to a multiplexer 206. Data D is supplied to a deformatter 205, which rearranges the data D, performs error correction encoding, or otherwise processes the data D, according to the data indicating the kinds of the data, and produces the processed data as data F to the multiplexer 206. The multiplexer 206 combines the data E and F and produces the combined data as data (E+F).

Of the input digital data, let F be data which might be rewritten. Let E be data which is not rewritten. Because of the presence of the gap 135, the data E and F can be rewritten separately. Only the data F can be rewritten while leaving behind the data E. In this way, a part of the data can be rewritten easily.

When data and its auxiliary data are recorded as the data (E+F), the auxiliary data can be easily updated by taking the body of the data as the data E and the auxiliary data as the data F.

If the data (E+F) is a digital video signal, the DC component of the data encoded inside the frame of image is selected as the data F, and the data E is taken as the other data. The data F is recorded in the audio signal recording area, while the data E is recorded in the video signal recording area. In this manner, plural sets of data about trick plays are previously separately recorded. During trick play, signals are played back only from the audio signal recording area. This makes it easy to play back the data about the trick plays. The data F is separated from the data (E+F) and then recorded; new data is neither created nor recorded. Therefore, the amount of information recorded on the tape is not increased. The amount of redundancy is small.

Figure 25:
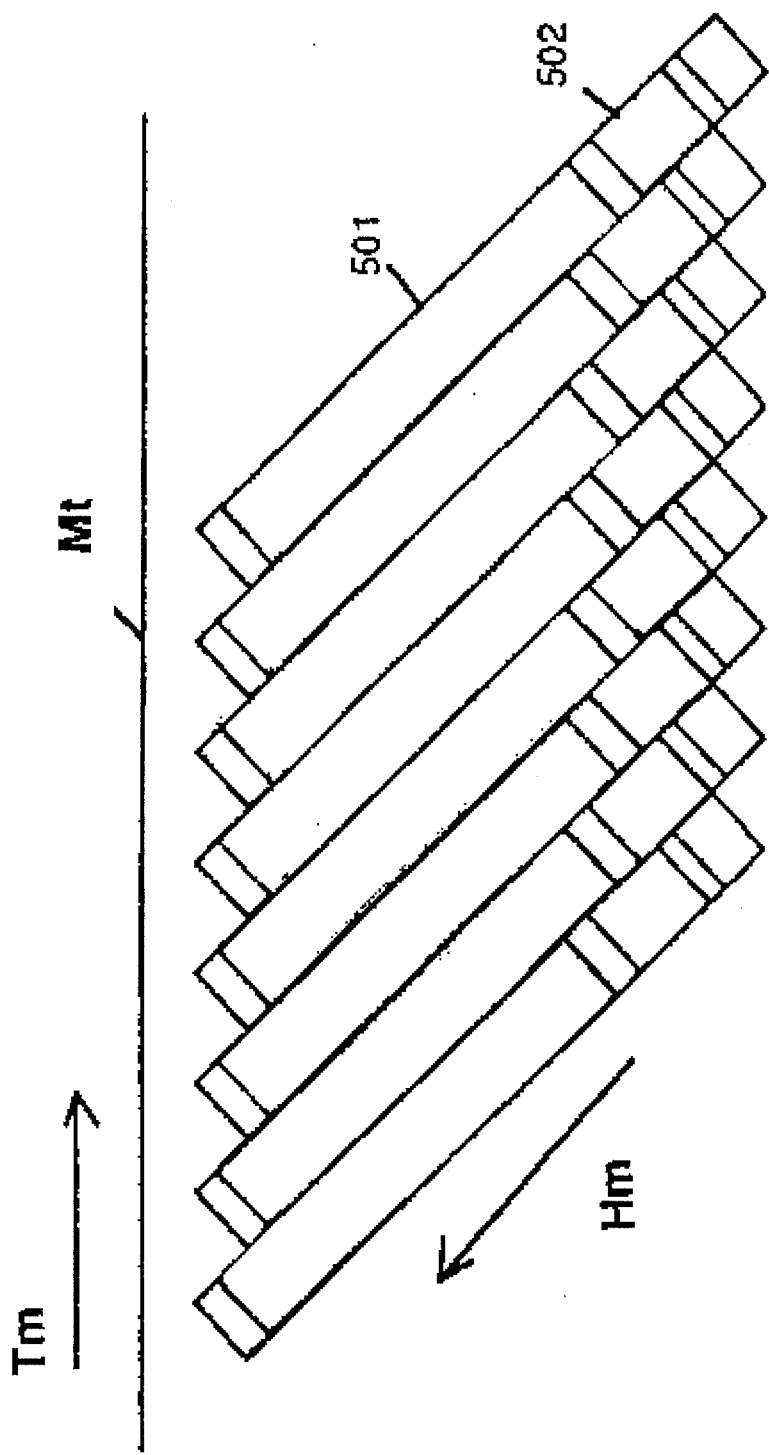
FIG. 25 is a diagram illustrating the track pattern created on magnetic tape by Example 1.

An example of the arrangement of tracks created on the magnetic tape 114 is shown in FIG. 25. The data E is recorded in an area 501. The data F about trick plays is recorded in an area 502. During normal playback, the data E and F are played back from the areas 501 and 502, respectively. These two kinds of data are combined and thus the data (E+F) is played back. During trick play, the data F is played back from the area 502. The data about the trick plays can be readily played back by recording the data in the area 502 plural times. Generation of signals and presentation on the viewing screen are facilitated by making the position of each individual data item in the area correspond to the position on the viewing screen.

In the above description, the data about the trick plays is the DC component of the data encoded inside the frame of image. Other component such as low-frequency components of orthogonal transformation coefficients may be extracted and recorded if the information contained in it is useful during search across the image displayed on the viewing screen. It is to be noted that the arrangement of tracks on the magnetic tape 114 shown in FIG. 25 merely constitutes one example. Other arrangements are possible.

Another example of the data processor 106 is shown in the block diagram of FIG. 8(a). Data (G+H) is input to a formatter 212. Similarly, data (G+H) is entered into a data selector 211. The data selector 211 selects data H from the data (G+H) in a given manner and sends the selected data H to another formatter 213. The formatter 212 rearranges the data (G+H), performs error correction encoding, or otherwise processes the data (G+H), if necessary, and produces the processed data as data C. The formatter 213 rearranges, performs error correction encoding, generates data indicating the kinds of the data, or otherwise processes the data H, if necessary, and produces the processed data as data D.

An example of the data processor 125 used for this purpose is shown in the block diagram of FIG. 8(b). During reading of data, the data C is supplied to a deformatter 214. This deformatter 214 rearranges the data C, performs error correcting, or otherwise processes the data C, according to the data about the kinds, and sends the processed data as data (G+H) to a deformatter 215. The deformatter 215 rearranges the data D, performs error correcting, or otherwise processes the data, and produces the processed data as data H. In this way, parts of the input data can be selected as auxiliary data and recorded independent of the main portion of the data.

Let G be the main data. Let H be the auxiliary data. If these two kinds of data have been recorded, the data H can be easily extracted during reading by previously selecting the data H from the data entered during writing. This makes it unnecessary to search the whole data for the data H during reading. This makes it possible to reduce the cost of the recording/playback apparatus. Furthermore, since the main data and auxiliary data are separated, errors are not propagated during reading if such errors are produced. The effects of errors can be reduced to a minimum.

Let data (G+H) be a digital video signal. Let H be that portion of the data H which is used for trick plays. Trick plays can be done with good image quality by recording the data H plural times, because the number of repetition with which the data used for trick plays is read during a fast search can be increased. If a method of doing trick plays with improved image quality is developed, the data about trick plays can be updated without rewriting the main data, by recording the data H about the trick plays in an area separate from the main data.

If important data is selected as the data H and recorded plural times, then the probability with which the important data can be played back is increased provided that the data contains errors. In consequence, the reliability can be enhanced.

Figure 9A:
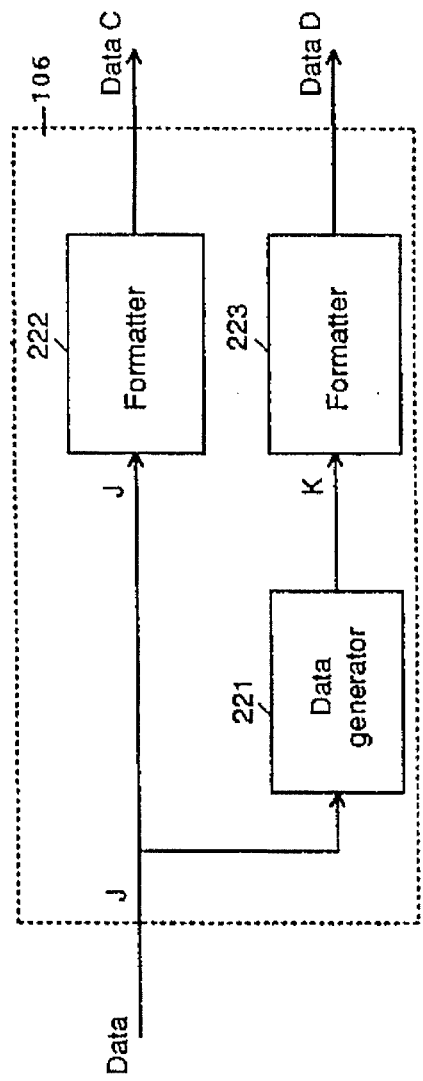
FIGS. 9(a) and 9(b) are block diagrams of other modifications of the data processors 106 and 125 shown in FIGS. 7(a) and 7(b)

A further example of the data processor 106 is shown in the block diagram of FIG. 9(a). Input data J is applied to a formatter 222 and also to a data generator 221. The data generator 221 creates new data K from the data J in a given manner and sends the data K to a formatter 223. The formatter 222 rearranges the generated data, performs error correction encoding, generates data about the kinds of the data, or otherwise processes the data, if necessary, and produces the processed data as data C. The formatter 223 rearranges the generated data, performs error correction encoding, generates data about the kinds of the data, or otherwise processes the data, if necessary, and produces the processed data as data D.

Figure 9B:
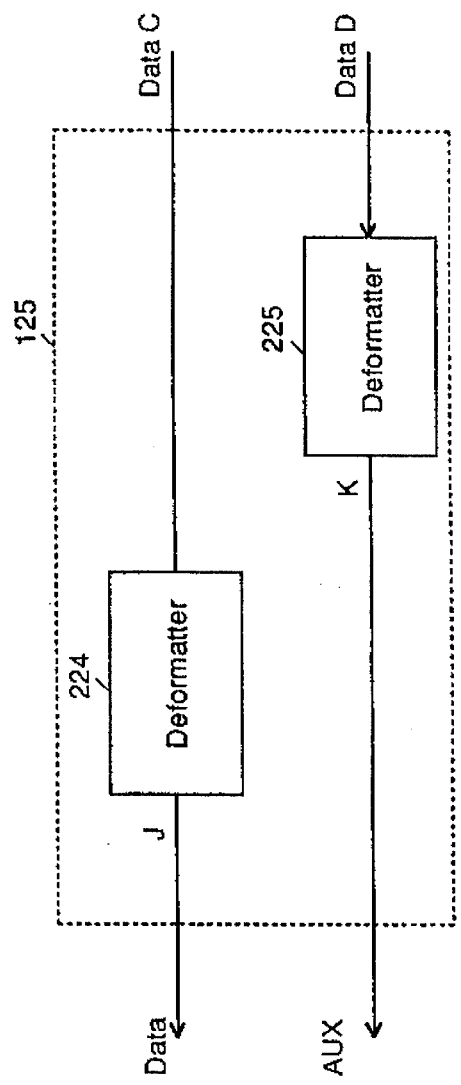

An example of the data processor 125 used for this purpose is shown in the block diagram of FIG. 9(b). During reading of data, data C is supplied to the deformatter 224. The deformatter 224 rearranges the data C, performs error correcting, or otherwise processes the data, according to the data about the kinds of the data, and produces the processed data as data J to the deformatter 225. The deformatter 225 rearranges the data D, performs error correcting, or otherwise processes the data, according to the data about the kinds of the data, and produces the processed data as data K. It is possible to create auxiliary data from the data entered in this way and to record the auxiliary data independent of the main data.

As an example, let data J and K be the main data and auxiliary data, respectively. The auxiliary data can be easily distinguished by creating the auxiliary data from the input data and recording the auxiliary data in an area different from the area in which the input data is recorded. Also, the data processor can be fabricated easily. Since the auxiliary data is separated from the main data, even if errors are produced during playback, the errors are not propagated. In consequence, the effects of the errors can be minimized.

When a digital video signal is entered as the data J, it is possible to create data about trick plays as the data K. Trick plays can be done with improved image quality by creating the data about trick plays independent of data about normal playback or reading. If a method of doing trick plays with improved image quality is developed, the data about trick plays can be updated without rewriting the main data, by recording the data K about the trick plays in an area separate from the main data.

Figure 10A:
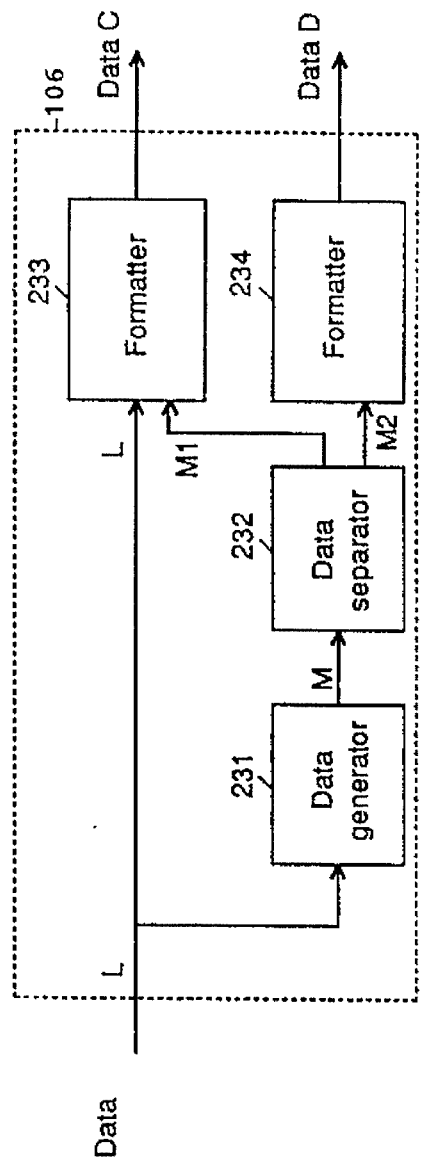
FIGS. 10(a) and 10(b) are block diagrams of still other modifications of the data processors 106 and 125 shown in FIGS. 7(a) and 7(b)

A yet other example of the data processor 106 is shown in the block diagram of FIG. 10(a). Input digital data L is entered into a formatter 233 and also into a data generator 231. The data generator 231 creates new data M from the data L in a given manner and sends the new data M to a data separator 232. The data separator 232 divides the data M into data M1 and M2 in a given manner. The data M1 and M2 are supplied to formatters 233 and 234, respectively. The formatter 233 rearranges the data L and M1, performs error correction encoding, generates data about the kinds of the data, or otherwise processes the data, if necessary, and produces the processed data as data C. The formatter 234 rearranges the data M2, performs error correction encoding, generates data about the kinds of the data, or otherwise processes the data, if necessary, and produces the processed data as data D.

Figure 10B:
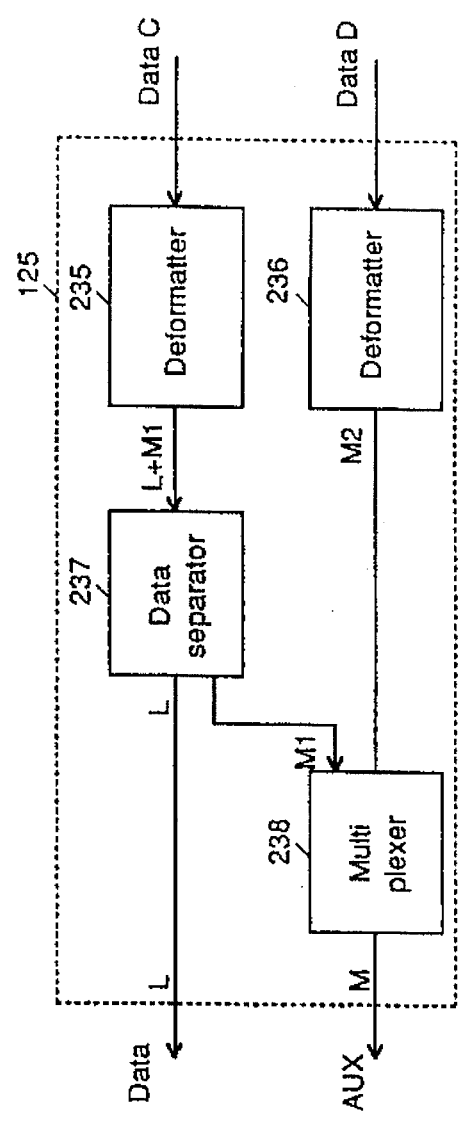

An example of the data processor 125 used for this purpose is shown in the block diagram of FIG. 10(b). During reading, the data C is supplied to a deformatter 235. The deformatter 235 rearranges the data C, performs error correcting, or otherwise processes the data, according to the data about the kinds of the data, and produces the processed data as data (L+M1) to a data separator 237. The data D is input to the deformatter 236. The deformatter 36 rearranges the data D, performs error correcting, or otherwise processes the data, according to the data about the kinds of the data, and produces the processed data as data M2 to a multiplexer 238. The data separator 237 divides the data (L+M1) into data L and data M1. The data separator 237 produces the data L as the output signal from the data processor 125 and supplies the data M1 to the multiplexer 238. The multiplexer 238 combines data M1 and M2 with the data M and produces the resulting data as auxiliary data. In this way, auxiliary data can be created from the input data and then the auxiliary data can be recorded.

Where digital data is recorded, let L be the digital data. Let M be created auxiliary data. Even if the size of the data M is larger than the audio signal recording area, the auxiliary data can be recorded and hence the recording of the auxiliary data is not restricted by the size of the audio signal recording area. As such, data can be recorded with improved efficiency. Those portions of the data M which might be rewritten is separated as data M2 and recorded. In this manner, the data M2 can be updated.

Figure 11A:
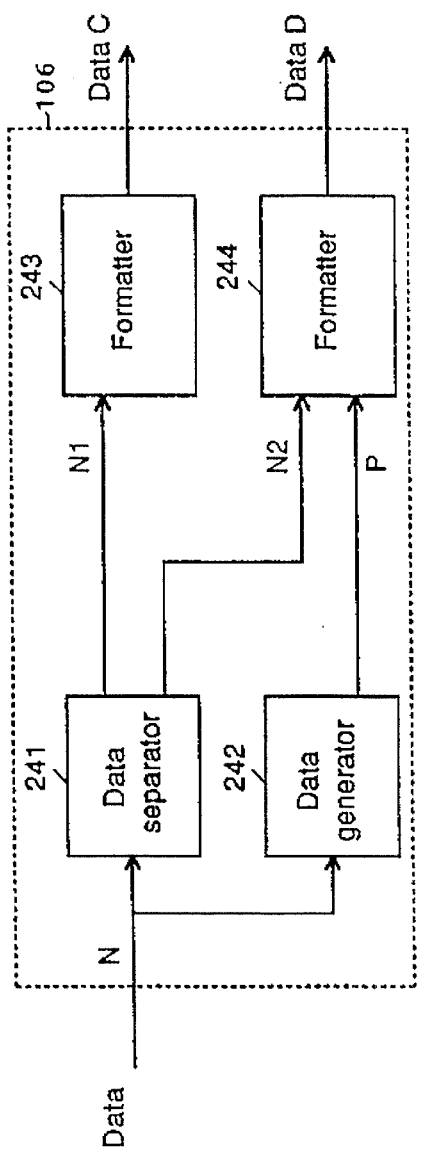
FIGS. 11(a) and 11(b) are block diagrams of yet other modifications of the data processors 106 and 125 shown in FIGS. 7(a) and 7(b)

A yet other example of the data processor 106 is shown in the block diagram of FIG. 11(a). Input data N is supplied to a data separator 241, which divides the data N into data N1 and data N2 in a given manner. The data separator 241 sends the generated data N1 and N2 to formatters 243 and 244, respectively. The input data is also supplied to a data generator 242. The data generator 242 creates new data P from the data N in a given manner and sends the divided data P to the formatter 244. The formatter 243 rearranges the data N1, performs error correction encoding, generates data about the kinds of the data, or otherwise processes the data, if necessary, and produces the processed data as data C. The formatter 244 rearranges the data N2 and P, performs error correction encoding, generates data about the kinds of the data, or otherwise processes the data, if necessary, and produces the processed data as data D.

Figure 11B:
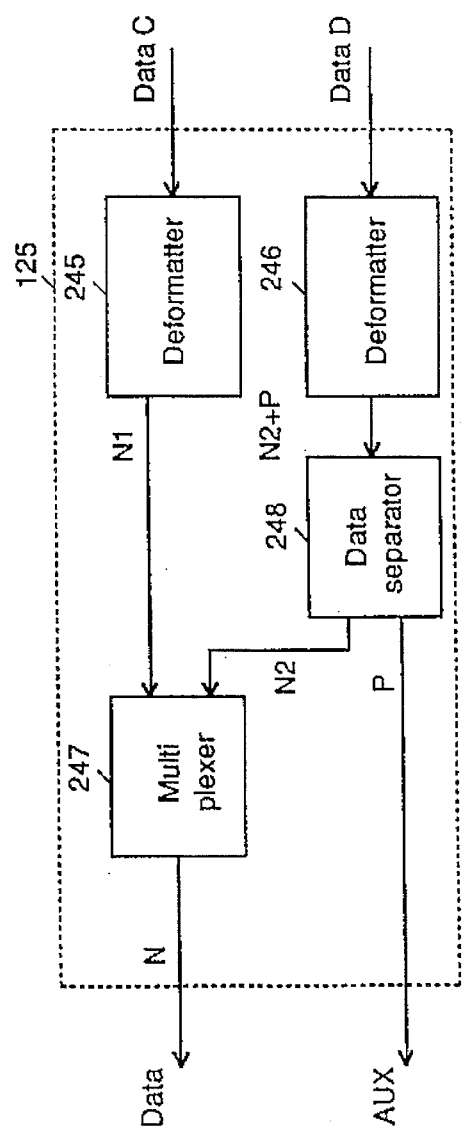

An example of the data processor 125 used for this purpose is shown in the block diagram of FIG. 11(b). During reading, the data C is supplied to a deformatter 245. The deformatter 245 rearranges the data C, performs error correcting, or otherwise processes the data, according to the data about the kinds of the data, and produces the processed data as data N1 to a multiplexer 247. The data D is supplied to a deformatter 246. The deformatter 246 rearranges the data D, performs error correcting, or otherwise processes the data, according to the data about the kinds of the data, and produces the processed data as data (N2+P) to a data separator 248. The data separator 248 divides the data (N2+P) into data N2 and data P. The data separator 248 sends the data N2 to the multiplexer 247 and produces the data P as auxiliary data. The multiplexer 247 combines the data N1 and N2 with the data N and produces the combined data. Thus, auxiliary data can be created from the input data and recorded.

In this structure, when digital data is recorded, let N be the input digital data. Let P auxiliary data created from the data N. Even if the amount of the data N is large, it can be divided into two and recorded in the video signal recording area and the audio signal recording area, respectively.

As an example, it is assumed that the data N is a digital video signal. When the amount of the data N is large, the data is recorded, using both video signal recording area and audio signal recording area. Furthermore, data about trick plays can be created as the data P and recorded.

A still other example of the data processor 106 is shown in the block diagram of FIG. 12(a). Input data Q is supplied to a data separator 251, which divides the data Q into data Q1 and data Q2 in a given manner. The data separator 251 sends the divided data Q1 and Q2 to formatters 254 and 255, respectively. The input data is also supplied to a data generator 252, which creates new data R from the data Q in a given manner and sends the data R to a data separator 253. The data separator 253 divides the data R into data R1 and data R2 and sends them to the formatters 254 and 255, respectively. The formatter 254 rearranges the data Q1 and R1, performs error correction encoding, generates data about the kinds of the data, or otherwise processes the data, if necessary, and produces the processed data as data C. The formatter 255 rearranges the data Q2 and R2, performs error correction encoding, generates data about the kinds of the data, or otherwise processes the data, if necessary, and produces the processed data as data D.

An example of the data processor 125 used for this purpose is shown in the block diagram of FIG. 12(b). During reading, the data C is input to a deformatter 256. The deformatter 256 rearranges the data C, performs error correcting, or otherwise processes the data, according to the data about the kinds of the data, and produces the processed data as data (Q1+R1) to a data separator 258. The data D is supplied to a deformatter 257. The deformatter 257 rearranges the data D, performs error correcting, or otherwise processes the data, according to the data about the kinds of the data, and produces the processed data as data (Q2+R2) to a data separator 259. The data separator 258 divides the data (Q1+R1) into data Q1 and data R2. The data separator 258 delivers the data Q1 and the data Q2 to multiplexers 260 and 261, respectively. The data separator 259 delivers the data Q2 and the data R2 to multiplexers 260 and 261, respectively. The multiplexer 260 combines the data Q1 and Q2 into data Q. The multiplexer 260 produces the data Q as digital data. The multiplexer 261 combines the data R1 and R2 into data R. The multiplexer 261 produces the data R as auxiliary data.

In this structure, the rate at which input digital data is recorded and the rate at which the generated data R is recorded can be set at will. As an example, let Q be the digital data. Let R be auxiliary data created from the data Q. Where the rate at which the data Q is input and the rate at which the data R is generated are variable, if the rate at which the data R is recorded is high, then the data R is divided. If the rate at which the data Q is recorded is high, then the data Q is divided. The divided data are recorded in the video signal recording area and the audio signal recording area, respectively, whereby the tracks can be used efficiently.

Where a digital video signal is recorded, it is assumed that the input digital video signal is the data Q and that trick play data created from the data Q is the data R. At this time, the data R is recorded in desired positions on the tracks such as the positions across which the head passes during trick play, thus enhancing the image quality during trick play.

Figure 13A:
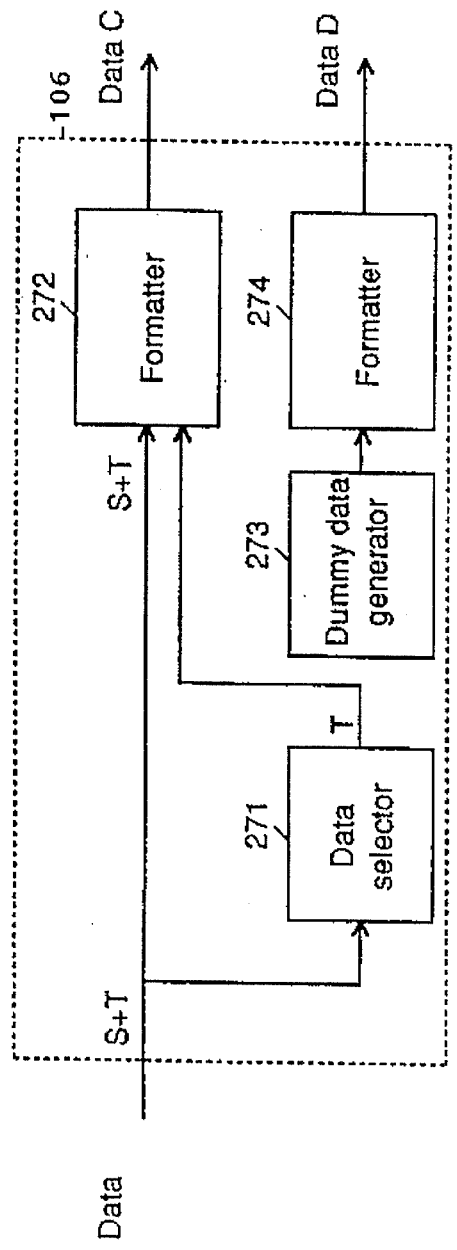
FIG. 13(a) and 13(b) are block diagrams of additional modifications of the data processors 106 and 125 shown in FIGS. 7(a) and 7(b)

A yet other example of the data processor 106 is shown in the block diagram of FIG. 13(a). Input data (S+T) is supplied to a formatter 272 and also to a data selector 271. The data selector 271 selects data T from the data (S+T) in a given manner and sends the selected data T to the formatter 272. A dummy data generator 273 produces dummy data to a formatter 274. The formatter 272 rearranges the data (S+T) and the data T, performs error correction encoding, generates data about the kinds of the data, or otherwise processes the data, if necessary, and produces the processed data as data C. The formatter 274 performs error correction encoding on the dummy data, generates data about the kinds of the data, or otherwise processes the dummy data, and produces the processed data as data D.

Figure 13B:
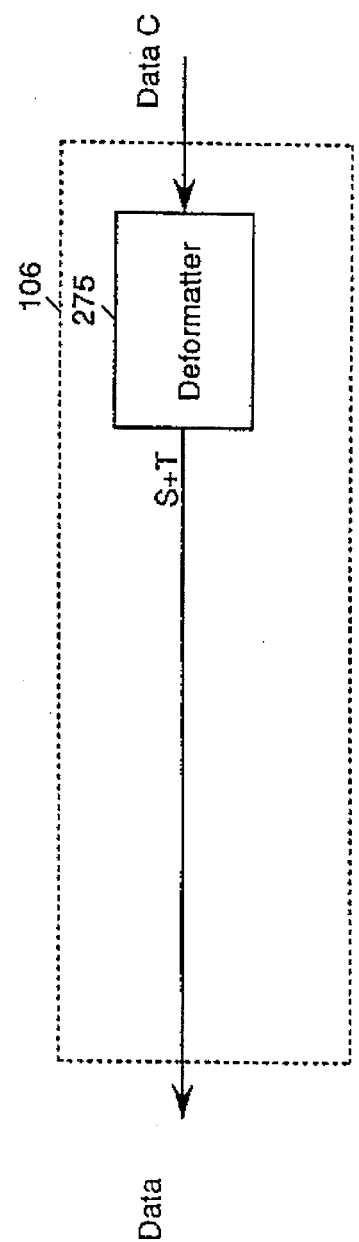

An example of the data processor 125 used for this purpose is shown in the block diagram of FIG. 13(b). During reading, the data C is supplied to a deformatter 275, which rearranges the data C, performs error correcting on the data C, or otherwise processes the data C, according to the data about the kinds of the data, and produces the processed data as data (S+T).

Where a digital video signal is recorded as the data (S+T), trick plays can be done with high image quality by recording some data T as trick play data, because the number of repetition with which the data T used for trick plays is read during fast search can be increased.

It is assumed that data T is important data of the data (S+T) and that the whole data is indicated by (S+T). During normal playback or reading, the data (S+T) is used. When the data on the magnetic tape is destroyed or in other similar situation, the important data can be protected by reading the data T. In this case, the reliability can be enhanced further by recording the same data plural times. The sizes of the circuits of the data processors 106 and 125 can be reduced by recording data only in the video signal recording area in this way.

Figure 14A:
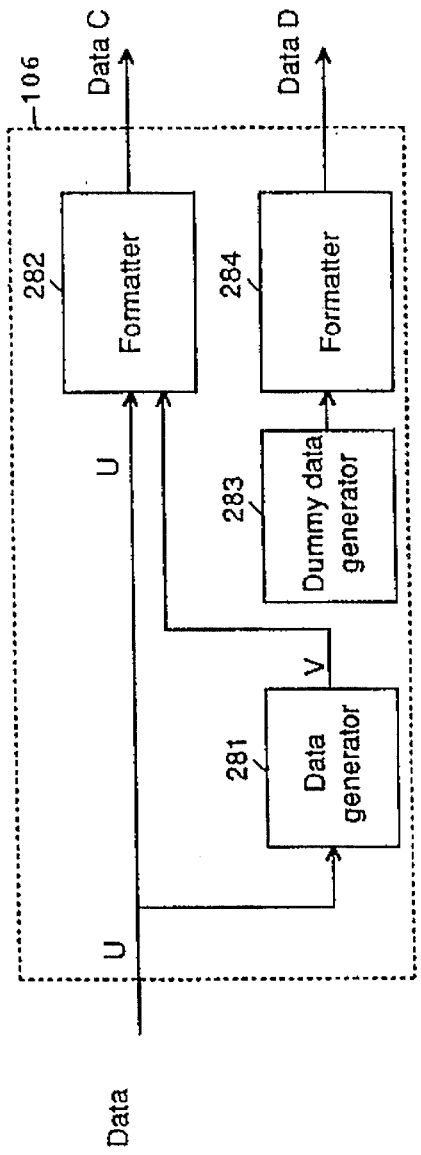
FIG. 14(a) and 14(b) are block diagrams of yet further modifications of the data processors 106 and 125 shown in FIGS. 7(a) and 7(b)

A still other example of the data processor 106 is shown in the block diagram of FIG. 14(a). Input data U is supplied to a formatter 282 and also to a data generator 281. The data generator 281 creates new data V from the data U in a given manner and sends the data V to the formatter 281. A dummy data generator 283 creates dummy data which is recorded on a formatter 284. The formatter 282 rearranges the data U and the data V, performs error correction encoding, generates data about the kinds of the data, or otherwise processes the data, if necessary, and produces the processed data as data C. The formatter 284 rearranges the dummy data, performs error correction encoding on the dummy data, generates data about the kinds of the data, or otherwise processes the dummy data, if necessary, and produces the processed data as data D.

Figure 14B:
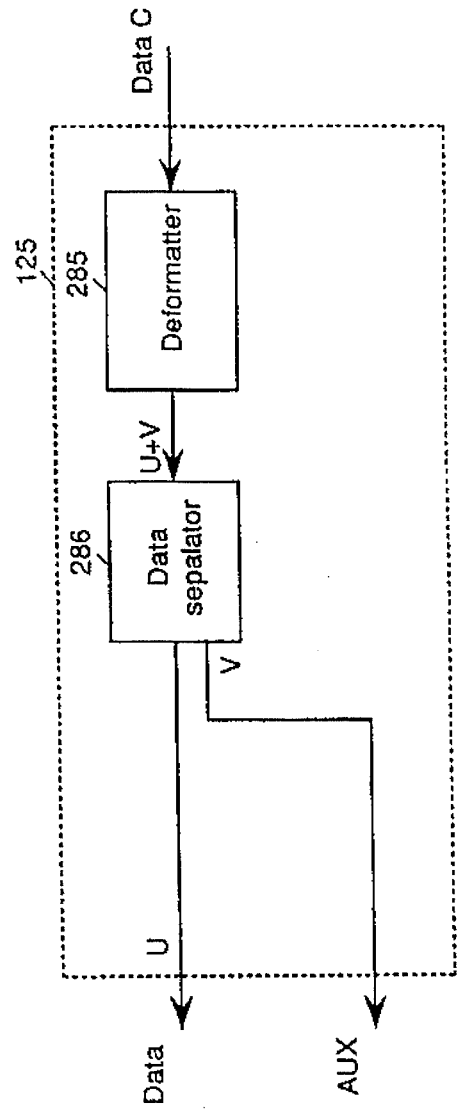

The data processor 125 used for this purpose is shown in the block diagram of FIG. 14(b). During reading of data, the data C is supplied to a deformatter 285. The deformatter 285 rearranges the data C, performs error correcting, or otherwise processes the data C, according to the data about the kinds of the data, and produces the processed data as data (U+V) to a data separator 286. The data separator 286 divides the data (U+V) into data U and data V. The data separator 286 produces the data U and V as digital data and auxiliary data, respectively.

It is assumed that the data U is the main portion of the data and that the data V is auxiliary data about the data U. Since recordings can be made irrespective of the sizes of the data V and U, recordings can be made efficiently if the sizes of the data V and U are variable.

It is possible to generate the data U as a digital video signal and to generate the data V as trick play data. In this case, recordings can be made efficiently if the sizes of the data U and V are variable. The size of the circuit of the data processor 106 can be reduced by recording data only in the video signal recording area in this way.

A yet other example of the data processor 106 is shown in the block diagram of FIG. 15(a). Input data W is supplied to a data distributor 293 and also to a data selector 291. The data selector 291 extracts the data X from the data W in a given manner. The data selector 291 sends the selected data X to the data distributor 293. The data W is also supplied to the data generator 292, which creates new data Y from the data W in a given manner. The data generator 292 delivers the generated data Y to a data distributor 293. The data distributor 293 selects data to be recorded in the video signal recording area from the data W, the data X, and the data Y, and sends the selected data as data Z1 to a formatter 294. The data distributor 293 selects data to be recorded in the audio signal recording area and sends the selected data as data Z2 to a formatter 295. The formatter 294 rearranges the data Z1, performs error correction encoding, generates data about the kinds of the data, or otherwise processes the data, if necessary, and produces the processed data as data D.

An example of the data processor 125 used for this purpose is shown in the block diagram of FIG. 15(b). During reading, the data C is supplied to a deformatter 296, which rearranges the data C, performs error correcting, or otherwise processes the data C, according to the data about the kinds of the data, and produces the processed data as data Z1 to a data distributor 298. Data D is supplied to a deformatter 297, which rearranges the data D, performs error correcting, or otherwise processes the data C, according to the data about the kinds of the data, and produces the processed data as data Z2 to a data distributor 298. The data distributor 298 creates data W from the data Z1 and Z2 and produces the data W as digital data. The data distributor 298 also creates data Y from the data Z1 and Z2 and produces the data Y as auxiliary data.

In this structure, auxiliary data X is selected as data X from the input data W, and other auxiliary data is created as data Y. These data can be recorded in the video signal recording area and the audio signal recording area, respectively.

For example, when a digital video signal is entered as the data W, auxiliary data such as the header of the digital video signal is selected as the data X. Trick play data is created as data Y from the data W. In this way, fast search can be done. Also, trick plays can be made.

When digital data is entered as the data W, information about the partition of the data W and auxiliary data about the sizes or other factors are selected as the data X. Auxiliary data indicating the positions at which the data W is recorded is created and recorded. This realizes recording/playback apparatus which can easily make a high-speed search.

Figure 16:
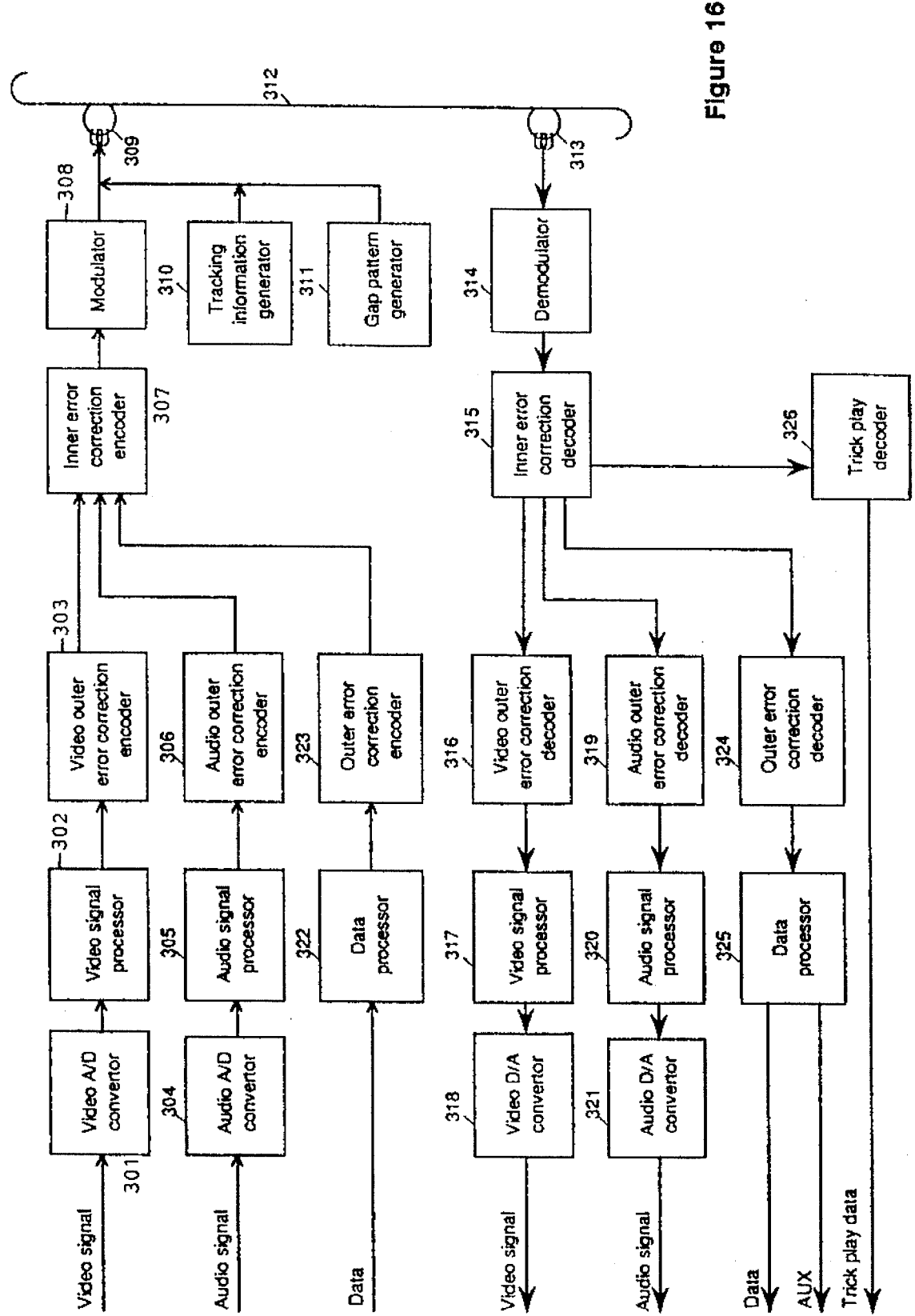
FIG. 16 is a block diagram of another recording/playback apparatus according to the invention, the apparatus forming Example 2 of the invention.

Referring next to FIG. 16, there is shown another recording/playback apparatus according to the present invention. When analog video and audio signals are recorded on magnetic tape 312 by the present apparatus, the analog video signal is supplied to a video A/D converter 301. This A/D converter 301 samples and quantizes the analog video signal to convert it into a digital video signal. This digital video signal is furnished to a video signal processor 302. The video signal processor 302 rearranges, compresses, or otherwise processes the digital video signal to create video data, which is produced to a video outer error correction encoder 303. The encoder 303 performs outer error correction encoding on the video data and creates video outer parities. The video data and the video outer parities are sent to an inner error correction encoder 307. The audio signal is supplied to an audio A/D converter 304, which samples, quantizes, or otherwise processes the audio signal to produce a digital audio signal to an audio signal processor 305. The audio signal processor 305 rearranges, compresses, or otherwise processes the digital audio data to create audio data. This audio data is sent to an audio outer error correction encoder 306. The audio outer error correction encoder 306 performs outer error correction encoding on the audio data and creates audio outer parities. The audio data and the audio outer parities are delivered to the inner error correction encoder 307. The inner error correction encoder 307 divides the video data, video outer parities, the audio data, and the audio outer parities into given blocks, performs inner video correction encoding on the blocks, creates inner parities, and places these inner parities behind the blocks. The blocks and the inner parities are sent to a modulator 308, which places sync patterns and block addresses before the blocks to form sync blocks. The sync patterns and the block addresses are employed to distinguish the blocks from each other during playback or reading. The modulator 308 modulates the sync blocks to produce a modulated signal to a record head 309. A tracking information generator creates information to activate the tracking servo and sends the information to the record head 309. A gap pattern generator 311 creates a pattern of interblock gaps and rear gaps and sends the pattern to the record head 309. The record head 309 records the modulated signal, the tracking information, and the gap pattern on the magnetic tape 312.

During playback of video and audio signals, the signals are played back from the magnetic tape 312 by a playback head 313. The output signal from the playback head 313 is sent to a demodulator 314. The demodulator 314 demodulates the output signal from the playback head, separates blocks, using sync patterns as marks, and produces the signal to an inner error correction decoder 315. This decoder 315 performs inner error corrections, based on the inner parities added to the blocks, and produces the blocks excluding the parities to an outer error correction decoder 316 and to an audio outer error correction decoder 319. At this time, the inner error correction decoder 315 produces those blocks recorded in the video signal recording area to the video outer error correction decoder 316 and those blocks recorded in the audio signal recording area to the audio outer error correction decoder 319, according to the addresses of these blocks. The video outer error correction decoder 316 performs outer error corrections on input blocks and produces the corrected blocks as video data to a video signal processor 317. The audio outer error correction decoder 319 performs outer error corrections on the input blocks and produces the corrected blocks as audio data to an audio signal processor 320. The video signal processor 317 rearranges, expands, or otherwise processes the video data to produce a digital video signal. The video signal processor 317 sends the digital video signal to a video D/A converter 318. The video D/A converter 318 converts the input digital video signal into an analog video signal and produces this analog signal as its output signal. The audio signal processor 320 rearranges, expands, or otherwise processes the audio data to produce a digital audio signal to an audio D/A converter 321. The audio D/A converter 321 converts the input digital audio signal into an analog audio signal and produces it as its output signal.

FIG. 2 shows the track pattern when video and audio signals are played back. A tracking information recording area 131, an audio signal recording area 132, and a video signal recording area 133 are recorded in this order from the head of each track. A gap 134 is recorded between the areas 131 and 132. Another gap 135 is recorded between the areas 132 and 133. A further gap 136 is recorded behind the area 133.

FIG. 3 shows the arrangement of recorded data. Video outer parities 152 are created from video data 151. A block 153 is created from both video data 151 and video outer parities 152. Similarly, audio outer parities 155 are created from the audio data 154. The block 153 is created from both audio data 154 and audio outer parities 155. Inner parities are created for the block 153 and placed behind the block. A sync pattern 158 and a block address 159 are placed before a block 157. These sync pattern 158, block address 159, block 153, and inner parities 156 together form a sync block 160. Sync blocks formed in this way are modulated and recorded. The gap 135 is recorded between sync blocks which are constituted by the video data 151 and the audio data 154, respectively. These gaps are used to permit the video and audio data to be separately recorded.

When digital data is recorded, the digital data is supplied to a data processor 322. This processor 322 rearranges the input digital data, creates data, selects some of the data, or performs other processing, and then creates data indicative of the kinds of the data. The data processor 322 sends the processed data to an outer error correction encoder 323. The outer error correction encoder 323 performs outer error correction encoding on the input data and creates outer parities. Both data and outer parities are delivered to the inner error correction encoder 307. The inner error correction encoder 307 divides the data and outer parities into given blocks, performs inner error correction encoding on the blocks, creates inner parities, and places these inner parities behind the blocks. The blocks and the inner parities are sent to a modulator 308. The modulator 308 places the sync pattern and the block addresses before the blocks to form sync blocks. Then, the modulator 308 modulates the sync blocks to produce a modulated signal to the record head 309. The tracking information generator 310 creates information used to activate the tracking servo, and sends the information to the record head 309. A gap pattern generator 311 creates a pattern of interblock gaps and rear gaps to the record head 309. The record head 309 records the modulated signal, the tracking information, and the gap pattern on the magnetic tape 312.

During reading of digital data, signals are read from the magnetic tape 312 by the playback head 313. The output signal from the playback head 313 is delivered to the demodulator 314, which demodulates the output signal from the playback head 313, divides the blocks, using sync patterns as marks, and sends these blocks to the inner error correction decoder 315. This decoder 315 performs inner error corrections, based on the inner parities added to the blocks, and produces the blocks excluding the parities to the outer error correction decoder 324. The outer error correction decoder 324 performs outer error correcting on the input blocks and sends the corrected data to the data processor 325. The data processor 325 rearranges, expands, or otherwise processes the data C and D according to the data about the kinds of the data, delivers the recorded digital data, and delivers created or selected auxiliary data.

When digital video data is recorded as the digital data and a trick play is done, the blocks corrected by the inner error correction decoder 315 are sent to a trick play decoder 326. This trick play decoder 326 decodes the digital video signal out of the input blocks and produces this signal as an output signal, for the following reason. During a trick play such as fast search, not all the data can be played back and so it is difficult to perform outer error correcting. The trick play decoder 326 is added only when digital video signals are recorded and played back.

Figure 17:
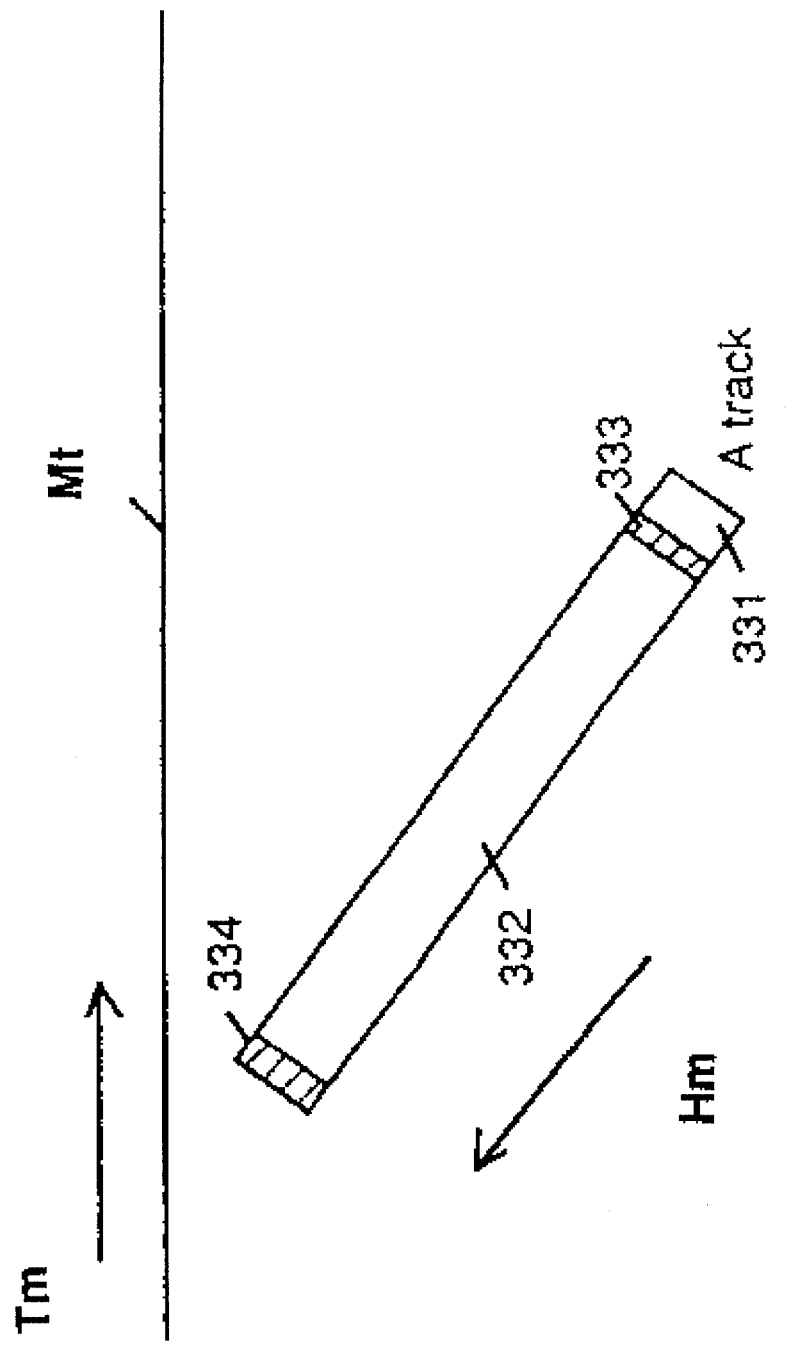
FIG. 17 is a diagram illustrating the track pattern created by the apparatus shown in FIG. 16.

FIG. 17 shows the track pattern when digital data is recorded. A tracking information recording area 331 and a data recording area 332 are recorded in this order from the head of each track. A gap 333 is recorded between the areas 331 and 332. Another gap 334 is recorded behind the area 332. The data recording area comprises the audio signal recording area 132, the video signal recording area 133, and the gap 135 shown in FIG. 2. Error correction encoding is performed on data, the data is modulated, and recorded in this data recording area.

Figure 18:
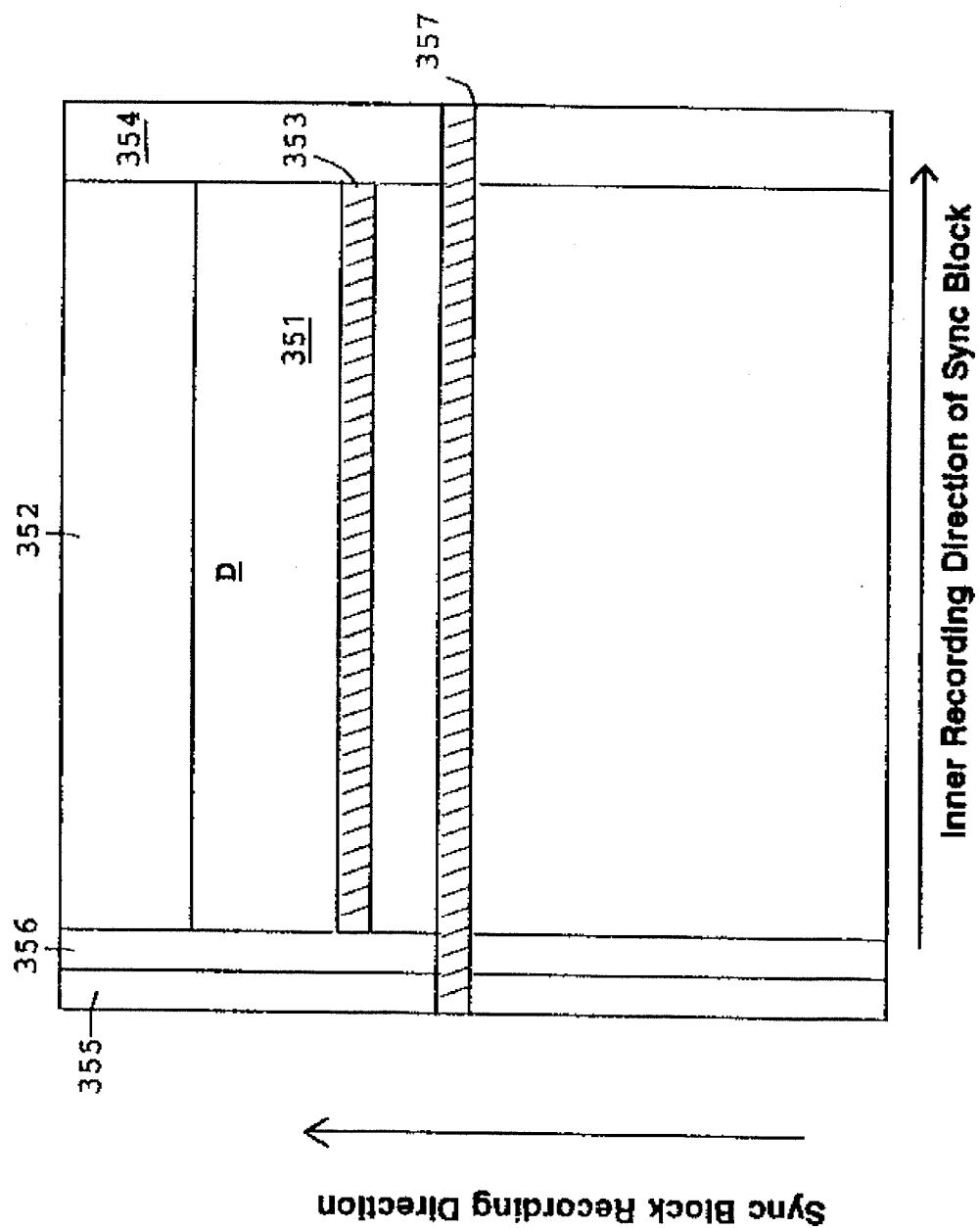
FIG. 18 is a diagram illustrating the structure of tracks created by the apparatus shown in FIG. 16.

FIG. 18 shows the arrangement of recorded data. Outer parities 352 are created from data 351. A block 353 is created from both data 351 and outer parities 352. Inner parities 354 are created for the block 353. A sync pattern 355 and a block address 356 are placed before the block 353. These sync pattern 355, block address 356, block 353, and inner parities 354 together form a sync block 357. Sync blocks formed in this way are modulated and recorded. The tracks can be used effectively by performing error correction encoding on data, modulating the data, recording the modulated data in the region made up of the video signal recording area, the audio signal recording area, and the gaps. Furthermore, the storage capacity can be increased.

Figure 19:
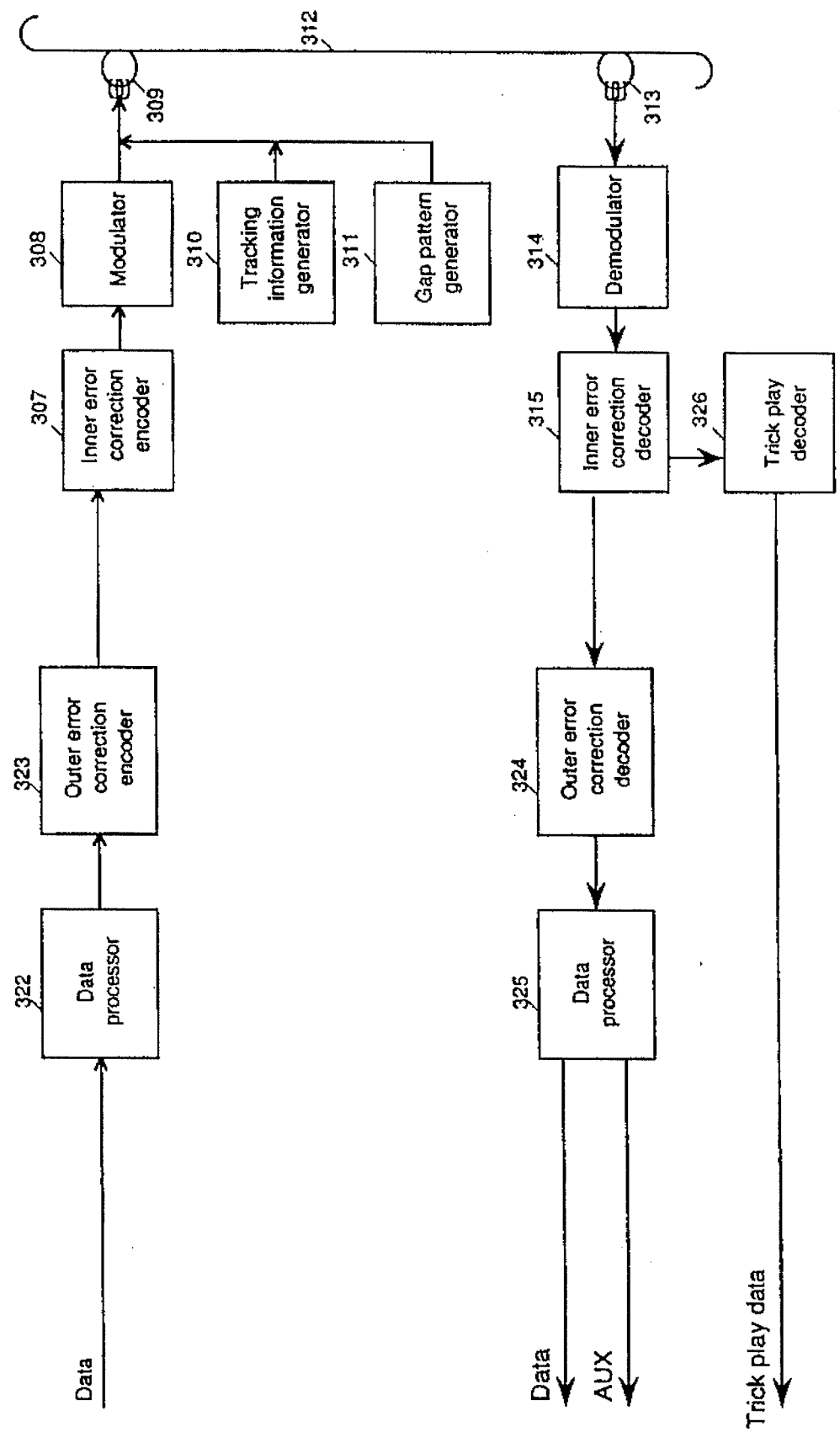
FIG. 19 is a block diagram of a modification of the apparatus shown in FIG. 16.

A recording/playback apparatus for writing and reading only digital data is shown in the block diagram of FIG. 19. This apparatus has a data processor 322, an outer error correction encoder 323, an inner error correction encoder 307, a modulator 308, a tracking information generator 310, a gap pattern generator 311, a record head 309, a magnetic tape 312, a playback head 313, a demodulator 314, an inner error correction encoder 315, an outer error correction encoder 324, a data processor 325, and a trick play decoder 326 all of which are the same as their counterparts shown in the block diagram of FIG. 16. This structure can write and read digital data. Because of this structure, a digital data storage drive and a digital VCR share circuitry. As a result, the apparatus has great advantages including low cost and compactness.

Figure 20:
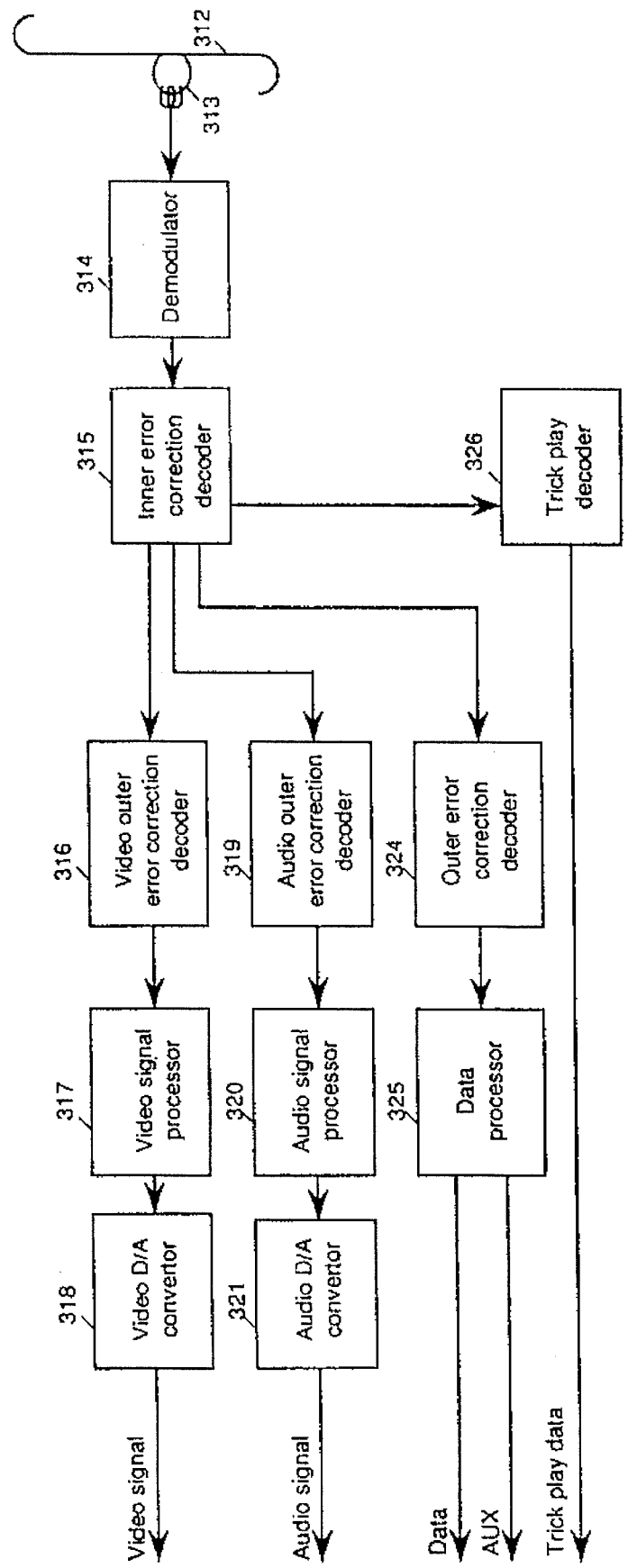
FIG. 20 is a block diagram of another modification of the apparatus shown in FIG. 16.

An apparatus for playing back video and audio signals and for reading digital data is shown in the block diagram of FIG. 20. This apparatus comprises a magnetic tape 312, a playback head 313, a demodulator 314, an inner error correction decoder 315, a video outer error correction decoder 316, an audio outer error correction decoder 319, a video signal processor 317, a video D/A converter 318, an audio signal processor 320, an audio D/A converter 321, an outer error correction decoder 324, a data processor 325, and a trick play decoder 326 all of which are same as their counterparts shown in FIG. 16. When the movable contacts of a switch 120 are connected with the terminals A, video and audio signals can be played back. When the movable contacts of the switch 120 are connected with the terminal B, digital data can be retrieved. Because of this structure, a digital data storage drive and a digital VCR share circuitry. As a result, the apparatus has great advantages including low cost and compactness.

Figure 21:
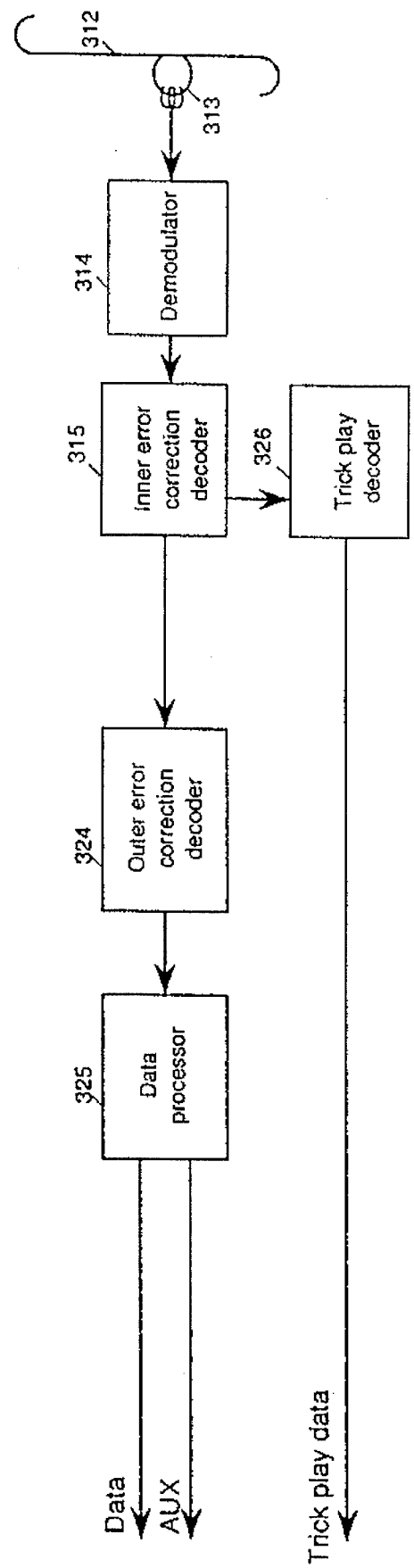
FIG. 21 is a block diagram of a yet other modification of the apparatus shown in FIG. 16.

A digital data storage drive is shown in the block diagram of FIG. 21. This apparatus has a magnetic tape 312, a playback head 313, a demodulator 314, an inner outer error correction decoder 315, an outer error correction decoder 324, a data processor 325, and a trick play decoder 326 all of which are the same as their counterparts shown in FIG. 16. This structure can read digital data. Because of this structure, a digital data storage drive and a digital VCR share circuitry. As a result, the apparatus has great advantages including low cost and compactness.

Figure 22A:
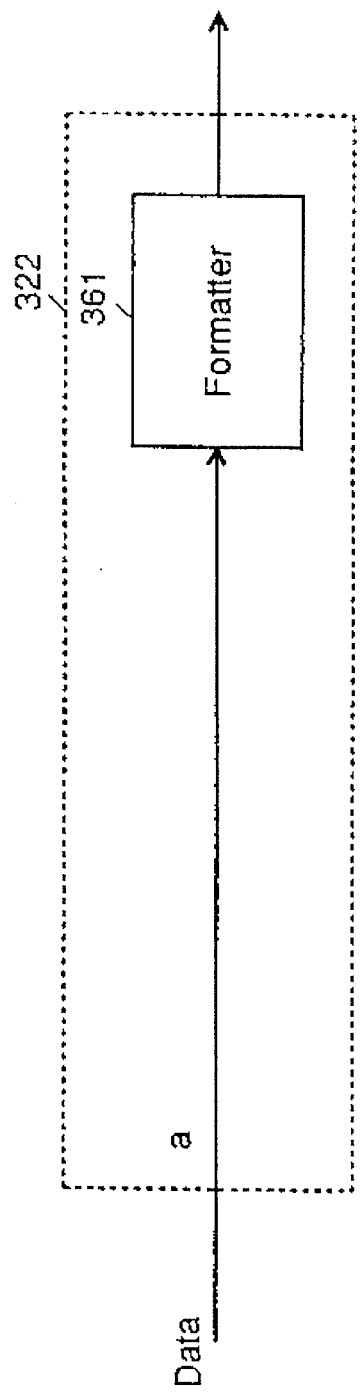
FIGS. 22(a) and 22(b) are block diagrams of data processors 322 and 325 of Example 2.

An example of the data processor 322 is shown in the block diagram of FIG. 22(a). Data a is supplied to a formatter 361. The formatter 361 rearranges the data, performs error correction encoding on the data, generates data about the kinds of the data, or otherwise processes the data, if necessary. The formatter 361 sends the processed data to an outer error correction encoder 323.

Figure 22B:
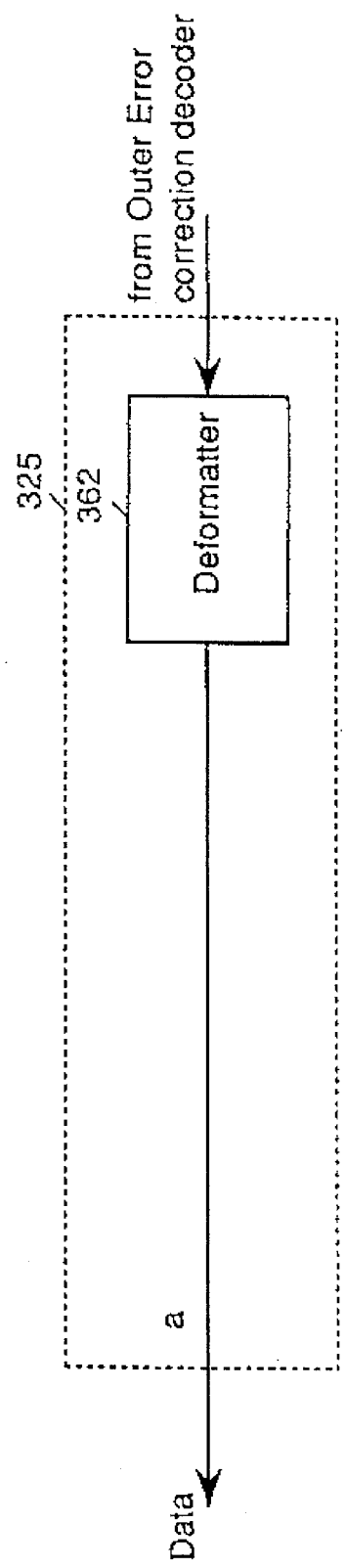

An example of the data processor 325 used for this purpose is shown in the block diagram of FIG. 22(b). During reading, error-corrected data is supplied to a deformatter 362 from the outer error correction decoder 324. The deformatter 362 rearranges the input data, performs error correcting, or otherwise processes the data, according to the data about the kinds of the data, and produces the processed data as data a. A larger amount of data can be recorded in a region than heretofore, because the region is made up of the video signal recording area, the audio signal recording area, and the gaps.

Figure 23A:
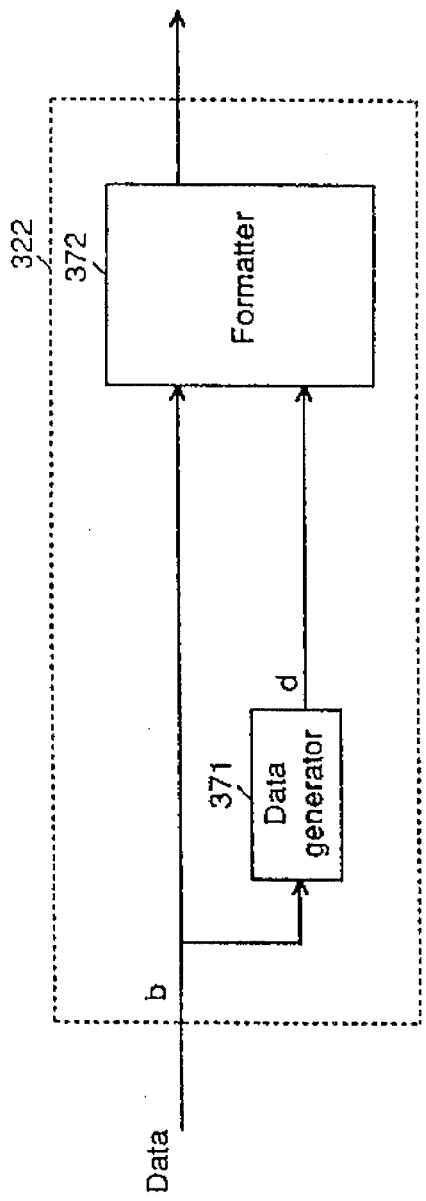
FIGS. 23(a) and 23(b) are block diagrams of modifications of the data processors 322 and 325 of Example 2.

Another example of the data processor 322 is shown in the block diagram of FIG. 23(a). Data b is supplied to a formatter 372 and also to a data generator 371. The data generator 371 creates new data d from the data b in a given manner and sends the created data d to a formatter 372. The formatter 372 rearranges the data b and d, performs error correction encoding, generates data about the kinds of the data, or otherwise processes the data, if necessary, and produces the processed data to the outer error correction encoder 323.

Figure 23B:
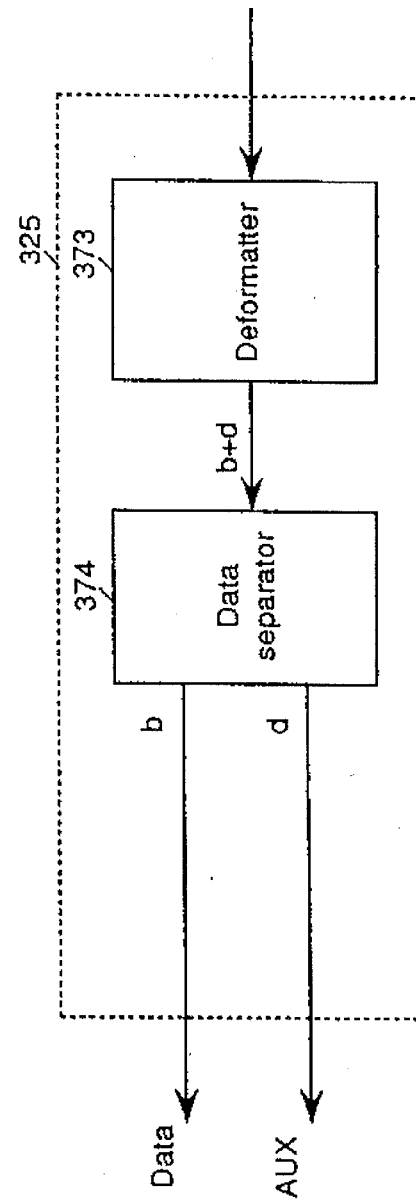

An example of the data processor 325 used for this purpose is shown in the block diagram of FIG. 23(b). During reading, error-corrected data is supplied to a deformatter 373 from the outer error correction encoder 324. The deformatter 373 rearranges the input data, performs error correcting, generates data about the kinds of the data, or otherwise processes the data, if necessary, and produces the processed data as data (b+d) to a data separator 374. The data separator 374 divides the data (b+d) into data b and data d. The data separator 374 produces the data b as digital data and the data d as auxiliary data.

In this way, auxiliary data can be created from input data and recorded. A larger amount of data can be recorded in a region than heretofore, because the region is made up of the video signal recording area, the audio signal recording area, and the gaps.

In this structure, auxiliary data is created from the input data b as data d, the auxiliary data indicating the kind, the name, the size, and other factors of the input data b. The data b and d are simultaneously recorded. This makes it easy to manage the data. Also, a search can be made easily.

When a digital video signal is recorded as the data b, a trick play can be done with good image quality by creating the data d as trick play data from the data b.

Figure 24A:
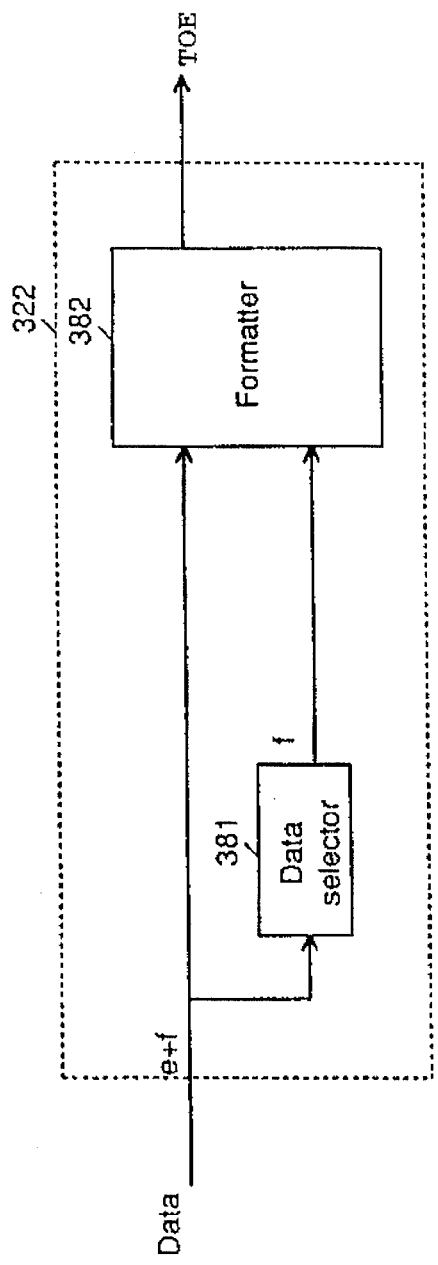
FIGS. 24(a) and 24(b) are block diagrams of other modifications of the data processors 322 and 325 of Example 2.

A further example of the data processor 322 is shown in the block diagram of FIG. 24(a). Data (e+f) is supplied to a formatter 382 and also to a data selector 381. The data selector 381 selects the data f out of the data (e+f) in a given manner and sends the selected data f to the formatter 382. The formatter 382 rearranges the data (e+f) and f, performs error correction encoding, generates data about the kinds of the data, or otherwise processes the data, if necessary, and sends the processed data to the outer error correction encoder 323.

Figure 24B:
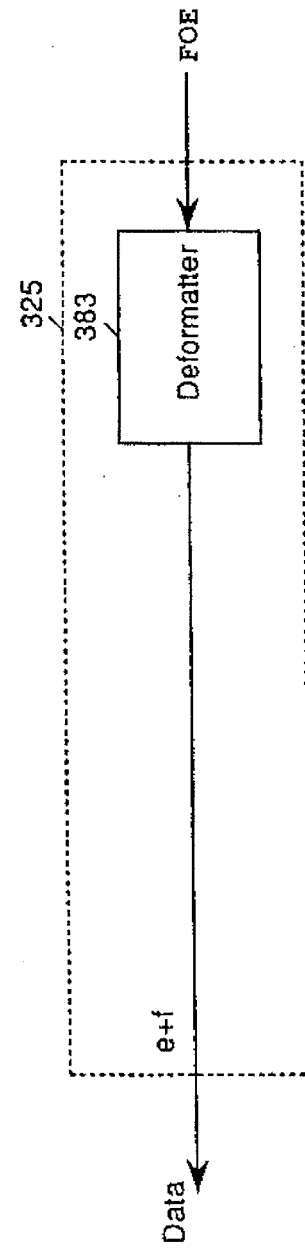

An example of the data processor 325 used for this purpose is shown in the block diagram of FIG. 24(b). During reading of data, the outer error correction encoder 324 supplies error-corrected data to the deformatter 383. The deformatter 383 rearranges the input data, performs error correcting, or otherwise processes the data, according to the data about the kinds of the data, and delivers data (e+f) as digital data.

At this time, a larger amount of data can be recorded in a region than heretofore, because the region is made up of the video signal recording area, the audio signal recording area, and the gaps. In this configuration, the reliability of the data can be enhanced further by selecting important data items out of the whole data and recording the important data items plural times.

When a digital video signal is recorded as the data e, trick plays can be done with good image quality by taking the data f as data necessary for the trick plays and recording the data as the data f plural times.

Figure 26:
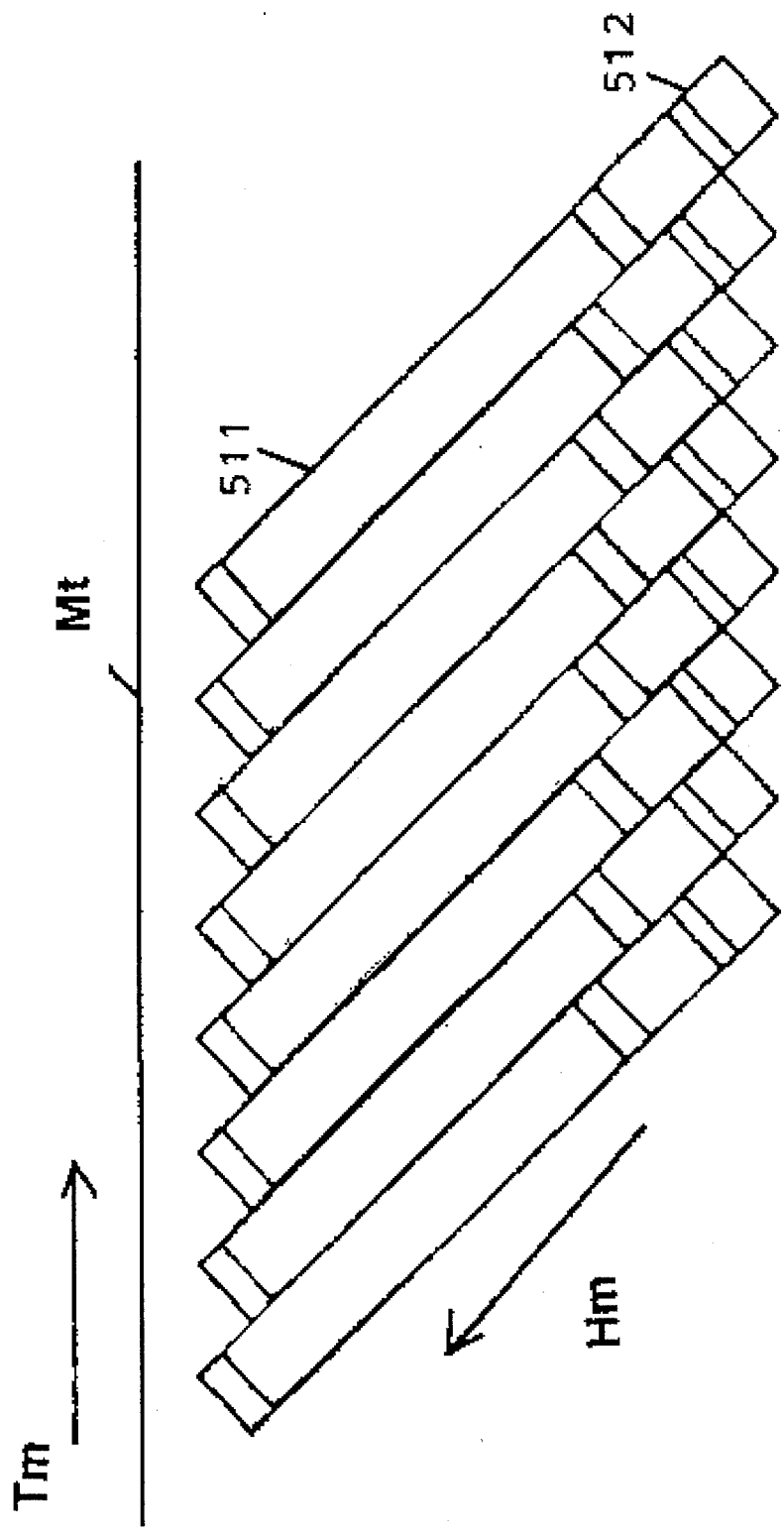
FIG. 26 is a diagram illustrating the track pattern created on magnetic tape by Example 2.

If the input data contains auxiliary data indicative of the kinds, names, sizes, and other factors of the data, the auxiliary data can be easily read out by selecting those data items and recording them separately. Furthermore, a search can be made quickly.

Where input data is a digital video signal, the DC component of data encoded inside the frame of image is separated from other data by the data processor and recorded. An example of the arrangement of the tracks on the magnetic tape 312 is shown in FIG. 26. Trick play data is recorded in an area 512. The other data is recorded in an area 511. During normal playback or reading, data are played back from both areas 512 and 511. During trick play, the DC component of data encoded inside the frame of image is played back as trick play data. In this way, the trick play data can be easily reproduced by previously separating the trick play data and recording it. Because the trick play data is separated from the input data and recorded without creating new data, the amount of information recorded on the tape is not increased. Hence, the amount of redundancy is small.

Furthermore, the trick play data can be easily read out by recording the trick play data in the area 512 plural times. Generation of signals and presentation on the viewing screen are facilitated by making the position of each individual data item in the area correspond to the position on the viewing screen.

In the above description, the input data is a digital video signal. The same effects can be produced by entering digitized audio and video data. The data can contain character information as offered in teletext services. The data indicative of the kinds of recorded data is recorded together with the body of the recorded data. The data indicative of the kinds may also be recorded in an auxiliary storage medium such as a semiconductor memory mounted to a cassette in which magnetic tape is held.

What is claimed is:

1. An apparatus for recording a video signal and an audio signal in a video signal recording area and an audio signal recording area, respectively, on a recording medium, and of playing back said video and audio signals from said recording areas, comprising;

a first data-processing means which, when digital data is entered and to be recorded, processes said digital data to organize first and second blocks;

a recording means for recording said first blocks in said video signal recording area on said recording medium and recording said second blocks in said audio signal recording area on said recording medium;

a playback means which, when said digital data is read out, reads the first blocks from said video signal recording area and reads said second blocks from said audio signal recording area; and a second data-processing means for constituting main data and auxiliary data from said first and second blocks, and outputting said main data and said auxiliary data.

2. The apparatus in accordance with claim 1, wherein said second data-processing means comprises a first deformatter means for reorganizing said first blocks into said main data and a second deformatter means for reorganizing said second blocks into said auxiliary data.

3. The apparatus in accordance with claim 1, wherein said second data-processing means comprises a first deformatter means for reorganizing said first blocks into first data, a second deformatter means for reorganizing said second blocks into second data, a data separator means for dividing said second data into said auxiliary data and third data, and a data-multiplexing means for combining said first and third data into said main data.

4. The apparatus in accordance with claim 1, wherein said second data-processing means comprises a first deformatter means for reorganizing said first blocks into first data, a second deformatter means for reorganizing said second blocks into second data, a data separator means for dividing said first data into said main data and third data, and a data-multiplexing means for combining said second and third data into said auxiliary data.

5. The apparatus in accordance with claim 1, wherein said second data-processing means comprises a first deformatter means for reorganizing said first blocks into first data, a second deformatter means for reorganizing said second blocks into second data, a data separator means for dividing said second data into third data and said auxiliary data, and a data-multiplexing means for combining said first and third data into said main data.

6. The apparatus in accordance with claim 1, wherein said second data-processing means comprises a first deformatter means for reorganizing said first blocks into first data, a second deformatter means for reorganizing said second blocks into second data, a first data separator means for dividing said first data into third and fourth data, and a second data separator means for dividing said second data into fifth and sixth data, a first data-multiplexing means for combining said third and fifth data into said main data, and a second data-multiplexing means for combining said fourth and sixth data into said auxiliary data.

7. The apparatus in accordance with claim 1, wherein said second data-processing means consists of a deformatter means for reorganizing said first blocks into said main data.

8. The apparatus in accordance with claim 1, wherein said second data-processing means comprises a first deformatter means for reorganizing said first blocks into first data and a data separator means for dividing said first data into said main data and said auxiliary data.

9. The apparatus in accordance with claim 1, wherein said recording means records said second blocks instead of some of codes for inspecting error correction codes for said analog audio signal.

10. The apparatus in accordance with claim 1, wherein said recording means records said second blocks instead of codes for inspecting outer error correction codes for said analog audio signal.

11. The apparatus in accordance with claim 1, wherein said first data-processing means creates data indicating kinds of said first blocks as parts of said first blocks and creates data indicating kinds of said second blocks as parts of said second blocks.

12. The apparatus in accordance with claim 1, wherein said first data-processing means comprises:

a data separator means for dividing input digital data into first and second data in a given manner;

a first block-organizing means for organizing said first data into said first blocks; and a second block-organizing means for organizing said second data into said second blocks.

13. The apparatus in accordance with claim 12, wherein when said digital data is a video signal, said first data separator means divides said digital data into important components and unimportant components.

14. The apparatus in accordance with claim 12, wherein said first data separator means divides said digital data into said main data and said auxiliary data that is information for managing the input digital data.

15. The apparatus in accordance with claim 1, wherein said first data-processing means comprises:

a first block-organizing means for organizing the input digital data into said first blocks;

a data selection means for selecting parts of said input digital data in a given manner; and a second block-organizing means for organizing data selected by said data selection means into said second blocks.

16. The apparatus in accordance with claim 15, wherein when said digital data is a video signal, said data selection means selects important components of said digital data as said auxiliary data.

17. The apparatus in accordance with claim 15, wherein when said digital data is a video signal, data compressed by encoding inside a frame of image is selected as said auxiliary data from said digital data.

18. The apparatus in accordance with claim 15, wherein said data selection means selects information about data which is entered as said auxiliary data from said digital data.

19. The apparatus in accordance with claim 1, wherein said first data-processing means comprises:

a first block-organizing means for organizing input digital data into said first blocks;

a data-creating means for creating new data from said input digital data in a given manner; and a second block-organizing means for organizing data created by said data-creating means into said second blocks.

20. The apparatus in accordance with claim 19, wherein when said digital data is a video signal, said data-creating means creates data about trick plays as said auxiliary data from said digital data.

21. The apparatus in accordance with claim 19, wherein said data-creating means creates information about input data as said auxiliary data from said digital data.

22. The apparatus in accordance with claim 1, wherein said first data-processing means comprises:

a data-creating means for creating new data from said input digital data in a given manner;

a data separator means for dividing output from said data-creating means into said first and second data;

a first block-organizing means for organizing said input digital data and said first data into said first blocks; and a second block-organizing means for organizing said second data into said second blocks.

23. The apparatus in accordance with claim 22, wherein when said digital data is a video signal, said data separator means divides said digital data into important components and unimportant components.

24. The apparatus in accordance with claim 22, wherein said first data separator means divides said digital data into said main data and said auxiliary data that is information used for managing the input digital data.

25. The apparatus in accordance with claim 22, wherein when said digital data is a video signal, said data-creating means creates data about trick plays as said auxiliary data from said digital data.

26. The apparatus in accordance with claim 22, wherein said data-creating means creates information about input data as said auxiliary data from said digital data.

27. The apparatus in accordance with claim 1, wherein said first data-processing means comprises:

a data separator means for dividing input digital data into first and second data in a given manner;

a data-creating means for creating data from said input digital data in a given manner;

a first block-organizing means for organizing said first data and output from said data-creating means into said first blocks; and a second block-organizing means for organizing said second data into said second blocks.

28. The apparatus in accordance with claim 27, wherein when said digital data is a video signal, said first data separator means divides said digital data into important components and unimportant components.

29. The apparatus in accordance with claim 27, wherein said first data separator means divides said digital data into said main data and said auxiliary data that is information used for managing the input digital data.

30. The apparatus in accordance with claim 27, wherein when said digital data is a video signal, said data-creating means creates data about trick plays as said auxiliary data from said digital data.

31. The apparatus in accordance with claim 27, wherein said data-creating means creates information about input data as said auxiliary data from said digital data.

32. The apparatus in accordance with claim 1, wherein said first data-processing means comprises:

a first data separator means for dividing input digital data into said first and second blocks;

a data-creating means for creating data from said input digital data in a given manner;

a second data separator means for dividing output from said data-creating means into third and fourth data;

a first block-organizing means for organizing said first and third data into said first blocks; and a second block-organizing means for organizing said second and fourth data into said second blocks.

33. The apparatus in accordance with claim 32, wherein when said digital data is a video signal, said first data separator means divides said digital data into important components and unimportant components.

34. The apparatus in accordance with claim 32, wherein said first data separator means divides said digital data into said main data and said auxiliary data that is information used for managing the input digital data.

35. The apparatus in accordance with claim 32, wherein said data selection means selects important components as said auxiliary data from said digital data.

36. The apparatus in accordance with claim 32, wherein when said digital data is a video signal, data compressed by encoding inside a frame of image is selected as said auxiliary data from said digital data by said data selection means.

37. The apparatus in accordance with claim 32, wherein said data selection means selects information about input data as said auxiliary data from said digital data.

38. The apparatus in accordance with claim 32, wherein when said digital data is a video signal, said data-creating means creates data about trick plays as said auxiliary data from said digital data.

39. The apparatus in accordance with claim 32, wherein said data-creating means creates information about input data as said auxiliary data from said digital data.

40. An apparatus for recording a video signal and an audio signal in a video signal recording area and an audio signal recording area, respectively, on a recording medium, and of playing back said video and audio signals from said recording areas, comprising:

means for creating a buffer area for rerecording one of video and audio signals;

a first data-processing means which, when digital data is recorded, processes said digital data and forms blocks;

a recording means for recording said blocks in a region consisting of the audio signal recording area, said buffer area, and the video signal recording area;

a playback means which, when said digital data is played back, plays back said blocks from said region; and a second data-processing means for constituting main data and auxiliary data about said main data from said blocks and outputting said auxiliary data and said main data.

41. The apparatus in accordance with claim 40, wherein said first data-processing means comprises:

a data-selecting means for selecting parts of input digital data in a given manner; and a block-organizing means for organizing data selected by said data-selecting means and said input digital data into blocks.

42. The apparatus in accordance with claim 41, wherein said data-selecting means selects information about said input data from said digital data.

43. The apparatus in accordance with claim 40, wherein said first data-selecting means comprises:

a data-selecting means for creating new data from said input digital data in a given manner; and a block-organizing means for organizing data selected by said data-selecting means and said input digital data into blocks.

44. The apparatus in accordance with claim 43, wherein when said digital data is a video signal, said data-generating means creates data about trick plays from said digital data.

45. The apparatus in accordance with claim 43, wherein said data-generating means creates information about said input data from said digital data.

46. The apparatus in accordance with claim 40, wherein when said digital data is a video signal, said first data-selecting means selects important components from said digital data.

47. The apparatus in accordance with claim 40, wherein said second data-processing means comprises a first deformatter means for reorganizing said blocks into first data and a data separator means for dividing said first data into said main data and said auxiliary data.

48. The apparatus in accordance with claim 40, wherein said first data-processing means creates data indicating kinds of said blocks as parts of said blocks.

* * * * *